(12) United States Patent
Lemmond et al.

(10) Patent No.: US 8,725,666 B2
(45) Date of Patent: May 13, 2014

(54) INFORMATION EXTRACTION SYSTEM

(75) Inventors: Tracy D. Lemmond, Pelzer, SC (US);
William G. Hanley, Livermore, CA (US); Joseph Wendell Guensche, Pleasanton, CA (US); Nathan C. Perry, Provo, UT (US); John J. Nitao, Castro Valley, CA (US); Paul Brandon Kidwell, Oakland, CA (US); Kofi Agyeman Boakye, Oakland, CA (US); Ron E. Glaser, Danville, CA (US); Ryan James Prenger, Oakland, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 408 days.

(21) Appl. No.: 13/037,284

(22) Filed: Feb. 28, 2011

(65) Prior Publication Data

US 2011/0213742 A1    Sep. 1, 2011

Related U.S. Application Data

(60) Provisional application No. 61/308,715, filed on Feb. 26, 2010.

(51) Int. Cl.
*G06F 15/18* (2006.01)
(52) U.S. Cl.
USPC .......................................................... 706/13
(58) Field of Classification Search
USPC .......................................................... 706/13
See application file for complete search history.

(56) References Cited

PUBLICATIONS

Chen et al., Exploiting Context Analysis for Combining Multiple Entity Resolution Systems, Jun. 29-Jul. 2, 2009, SIGMOD '09.*
Sigletos et al., Combining Information Extraction Systems Using Voting and Stacked Generalization, J. Machine Learning Research 6 (2005).*
Petkova and Croft, Proximity-based Document Representation for Named Entity Retrieval, Nov. 6-8, 2007, CIKM '07.*
Augichtein, E., Confidence Estimation Methods for Partially Supervised Relation Extraction, SIAM Conference on Data Mining 2006, pp. 539-543.
Kozareva, Z., et al., Combining data-driven systems for improving Named Entity Recognition, Data & Knowledge Engineering 2007, 61: 449-466.
Augichtein, E., et al., Predicting Accuracy of Extracting Information from Unstructured Text Collections, Proc. of the 14th ACM international conference on Information and Management, Oct. 31-Nov. 5, 2005, Bremen, Germany.
Duong, D., et al., Support Vector Machines to Weight Voters in a Voting System of Entity Extractors, 2006 Intl. Joint Conference on Neural Networks, Jul. 16-21, 2006, Vancouver, BC, pp. 1226-1230.
Wang, H., et al., Identifying Named Entities in Biomedical Text Based on Stacked Generalization, Proc. of the 7th World Congress on Intelligent Control & Automation, Jun. 25-27, 2008, Chongqing, China, pp. 160-164.

(Continued)

*Primary Examiner* — Kakali Chaki
*Assistant Examiner* — Michael Zidanic
(74) *Attorney, Agent, or Firm* — Steinfl & Bruno, LLP

(57) ABSTRACT

An information extraction system and methods of operating the system are provided. In particular, an information extraction system for performing meta-extraction of named entities of people, organizations, and locations as well as relationships and events from text documents are described herein.

6 Claims, 10 Drawing Sheets

(56) References Cited

PUBLICATIONS

Breiman, L., Random Forests, Machine Learning 2001, 45: 5-32.

Wu, D., et al., A Stacked, Voted, Stacked Model for Named Entity Recognition, Proc. CoNLL-2003, 4: 200-203.

Brill, E., et al., Classifier Combination for Improved Lexical Disambiguation, Proc. of the $17^{th}$ intl. conference on Computational linguistics 1998, Montreal, Canada, pp. 191-195.

Florian, R., Named Entity Recognition as a House of Cards: Classifier Stacking, Proc. $6^{th}$ Conference on Natural Langauge Learning 2002, 20: 1-4.

Brin, S., Extracting Patterns and Relations from the World Wide Web, Selected Papers from the Intl. Workshop on the World Wide Web and Databases 1998, pp. 172-183.

Kambhatla, N., Minority Vote: At-Least-N Voting Improves Recall for Extracting Relations, Proc. of the COLING/ACL 2006, pp. 460-466.

Brody, S., et al., Ensemble Methods for Unsupervised WSD, Proc. of the $21^{st}$ Intl. Conference on Computational Linguistics 2006, pp. 97-104.

Bunescu, R., et al., Subsequence Kernels for Relation Extraction, Proc. of the $19^{th}$ Conference on Neural Information Processing Systems 2005, pp. 1-8.

Florian, R., et al., Named Entity Recognition through Classifier Combination, Proc. CoNLL-2003, 4: 168-171.

Bunke, H., et al. A Comparison of Algorithms for Maximum Common Subgraph on Randomly Connected Graphs, Structural, Syntactic, and Statistical Pattern Recognition 2006, 2396: 123-132.

Si, L., et al., Boosting Performance of Bio-Entity Recognition by Combining Results from Multiple Systems, Proc. $5^{th}$ Intl. Workshop on Bioinformatics 2005, pp. 76-83.

Carreras, X., et al., Named Entity Extraction using AdaBoost, Proc. $6^{th}$ conference on Natural language learning 2002, 20: 1-4.

Cunningham, H., et al., Gate: an Architecture for Development of Robust HLT Applications, Proceedings of.The 40th Annual Meeting of the Association for Computational Linguistics (ACL), Philadelphia, Jul. 2002, pp. 168-175.

Che, W., et al., A Hybrid Convolution Tree Kernel for Semantic Role Labeling, Proc. of the COLING/ACL 2006, pp. 73-80.

Chen, J., et al., Relation Extraction Using Label Propagation Based Semi-supervised Learning, Proceedings of the 21st International Conference on Computational Linguistics and 44th Annual Meeting of the ACL, 2006, pp. 129-136.

Collins, M., et al., Ranking Algorithms for Named—Entity Extraction: Boosting and the Voted Perceptron, Proceedings of the 40th Annual Meeting of the Association for Computational Linguistics (ACL), Philadelphia, Jul. 2002, pp. 489-496.

Lemmond, T., et al., Enhanced Named Entity Extraction via Error-Driven Aggregation, International.Conference on Data Mining 2010, Las Vegas, NV, pp. 1-7.

Collins, M., et al., New Ranking Algorithms for Parsing and Tagging: Kernels over Discrete Structures, and the Voted Perceptron, Proc. $40^{th}$ Annual Meeting on Association for Computational Linguistics 2001, pp. 263-270.

Cormode, G., et al., the String Edit Distance Matching Problem With Moves, ACM Trans. on Algorithms 2007, 3: 1-19.

Crestani, F. An Experimental Study of the Effects of Word Recognition Errors in Spoken Queries on the Effectiveness of an Information Retrieval System, ICSI 1999, pp. 1-29.

Domingos, P., Bayesian Averaging of Classi_ers and the Over_tting Problem, Proc. $17^{th}$ ICML 2000, pp. 223-230.

Creswell, C., et al. Automatically Extracting Nominal Mentions of Events with a Bootstrapped Probabilistic Classifier, Proc. of the COLING/ACL 2006, pp. 17-21.

Culotta, A., et al., Integrating Probabilistic Extraction Models and Data Mining to Discover Relations and Patterns in Text, 2006, pp. 1-8.

Hoeting, J.A., et al., Bayesian Model Averaging: A Tutorial, Statistical Science 1999, 14: 282-417.

Culotta, A., et al., Dependency Tree Kernels for Relation Extraction, Proc. $42^{nd}$ Annual Meeting on Association for Computational Linguistics 2004, pp. 1-8.

Curran, J., Ensemble Methods for Automatic Thesaurus Extraction, Proceedings of the Conference on Empirical Methods in Natural Language Processing (EMNLP), Philadelphia, Jul. 2002, pp. 222-229.

Downey, D., et al., A Probabilistic Model of Redundancy in Information Extraction, Proc. of IJCAL 2005, pp. 1-8.

Finn, A. et al., Multi-level Boundary Classification for Information Extraction, Proc. Eur. Conf. on Machine Learning 2004, pp. 1-12.

Gu, Z., et al., Segment-based Hidden Markov Models for Information Extraction, Proceedings of the 21st International Conference on Computational Linguistics and 44th Annual Meeting of the ACL 2006, pp. 481-488.

Hasegawa, T., et al., Discovering Relations among Named Entities from Large Corpora, Proc. $42^{nd}$ Annual Meeting on Association for Computational Linguistics 2004, pp. 1-8.

Hickling, T.L. et al., Methodologies and Metrics for Assessing the Strength of Relationships between Entities within Semantic Graphs, Lawrence Livermore National Laboratroy, UCRL-TR-216074 2005, pp. 1-34.

Huang, M., et al.., A hybrid method for relation extraction from biomedical literature, Int. J. Med Information 2006, 75: 443-455.

Ji, H., et al., Analysis and Repair of Name Tagger Errors, Proc. of the COLING/ACL 2006, pp. 420-427.

Jimenez, D., et al., Dynamically Weighted Ensemble Neural Networks for Classification, Proc. of the Intl joint Conference on Neural Networks IJCNN 1998, pp. 753-756.

Kim, J.H., et al., Unsupervised Named Entity Classification Models and their Ensembles, Proc. $19^{th}$ on Computational linguistics 2002, pp. 1-7.

Krishnan, V., et al., An Effective Two-Stage Model for Exploiting Non-Local Dependencies in Named Entity Recognition, Proc. $21^{st}$ Intl. Conference on Computational Linguistics & $44^{th}$ Annual Meeting of the NCL 2006, pp. 1121-1128.

Kwek, S., et al., iBoost: Boosting Using an instance-Based Exponential Weighting Shceme, LNAI 2002, pp. 246-257.

Liu, Y., et al., A New Pairwise Ensemble Approach for Text Classification, LNAI 2003, pp. 277-288.

Maguitman, A., et al., Algorithmic Computation and Approximation of Semantic Similarity, World Wide Web 2006, 9: 431-456.

Maslennikov, M., et al., ARE: Instance Splitting Strategies for Dependency Relation-based Information Extraction, Proc. of the COLING/ACL 2006, pp. 571-578.

McCallum, A., et al., A Note on the Unification of Information Extraction and Data Mining using Conditional—Probability, Relational Models, IJCCA103 2003, pp. 1-8.

Myers, R., et al., Bayesian Graph Edit Distance, IEEE Trans. on Pattern Analysis and Machine Intelligence 2000, 22: 628 -635.

Neuhaus, M., et al., A Probabilistic Approach to Learning Costs for Graph Edit Distance, Proc. $17^{th}$ Intl Conference on Pattern Recognition 2004, 3: 23-26.

Nguyen, L., et al., Semantic parsing with Structured SVM Ensemble Classification Models, Proc. of the COLING/ACL 2006, pp. 619-626.

Oleshchulk, V., et al., Ontology Based Semantic Similarity Comparison of Documents, $14^{th}$ Intl. Workshop on Database & Expert Systems Applications 2003, pp. 735-738.

Palmer, D., et al., Improving Information Extraction by Modeling Errors in Speech Recognizer Output, pp. 1-5, Proceedings of the First International Conference on Human Language Technology Research, 2001.

Richardson, R., et al., Using WordNet as a Knowledge Base for Measuring Semantic Similarity between Words, Technical Report Working Paper 1994, pp. 1-14.

Samatova, N. F., et al., Information Extraction from Unstructured Text for the Biodefense Knowledge Center, Lawrence Livermore National Laboratory UCRL-CONF-213354 2005, pp. 1-14.

Sanchez-Graillet, O., et al., Acquiring Bayesian Networks from Text, The $4^{th}$ LREC Proceedings 2004, pp. 1-4.

(56) References Cited

PUBLICATIONS

Bai, X., et al., Graph Matching using Spectral Embedding and Alignment, Proc. 17$^{th}$ Conference on Pattern Recognition 2004, 3: 398-401.

Bontcheva, K., et al., Using GATE as an Environment for Teaching NLP, Univ. of Penn. 2002, pp. 1-9.

Kegelmeyer, P., et al., Pattern Recognition for Massive, Messy Data, CS SIS Workshop 2006, pp. 1-18.

Alias-I LingPipe 3.8.2, 2008, Alias-I, Inc., retrieved from http://alias-i.com/lingpipe on Mar. 16, 2012.

Robles-Kelly, A., et al., Graph Edit Distance from Spectral Seriation, IEEE Trans. on Pattern Analysis and Machine Intelligence 2005, 27: 365-378.

Rodriguea, M.A., et al., Determining Semantic Similarity among Entity Classes from Different Ontologies, IEEE Trans. on Knowledge and Data Engineering 2003, 15: 442-457.

Sang, E., et al., Introduction to the CoNLL-2003 Shared Task: Language-Independent Named Entity Recognition, Proc. of CoNLL-2003, 4: 142-147.

Sang, E., et al., Noun Phrase Recognition by System Combination, Proc. of 1$^{st}$ on N. A. chapter of the Assoc for Computational Linguistics 2000, pp. 50-55.

Shinyama, Y., et al., Preemptive Information Extraction using Unrestricted Relation Discovery, Human Language Technology Conference, NY, NY 2006, pp. 304-311

Skounakis, M., et al., Hierarchical Hidden Markov Models for Information Extraction, Proc. 18$^{th}$ Intl. Joint.Conference on Artificial Intelligence 2003, pp. 1-7.

Sloane, N. J. A., On-line Encyclopedia of Integer Sequences, 2003, The OESIS Foundation Inc., retrieved from http://oeis.org/A001519 on Mar. 16, 2012.

Stanford Named Entity Recognizer 1.1, 2008, Stanford NLP Group, retrieved from http://nlp.standford.edu/software/CRF-NER.shtml on Mar. 16, 2012.

University of Ottawa Baseline Information Extraction (BAILE) 2004, School of Information Technology and Engineering, retrieved from http://baile.sourceforge.net/ on Mar. 15, 2012.

Utsuro, T., et al., Combining Outputs of Multiple Japanese Named Entity Chunkers by Stacking, Proc. of the Conference on EMNLP 2002, pp. 281-288.

Vivaldi, J., et al., Improving Term Extraction by System Combination using Boosting, Proc. 12$^{th}$ European.Conference on Machine Learning 2001, pp. 515-526.

Yuan, S., et al., Ontology-Based Structured Cosine Similarity in Document Summarization: With Applications to Mobile Audio-Based Knowledge Management, IEEE Trans on Systems, Man, and Cybernetics—Part B: Cybernetics 2005, 35: 1028-1040.

Zelenko, D., et al., Kernel Methods for Relation Extraction, Journal of Machine Learning Research 2003, 3: 1083-1106.

Zhang, M., et al., A Composite Kernel to Extract Relations between Entities with both Flat and Structured Features, Proceedings of the 21st International Conference on Computational Linguistics and 44th Annual Meeting of the ACL 2006, pp. 825-832.

Zhang, Z., et al., Weakly-Supervised Relation Classification for Information Extraction, Proc. 13$^{th}$ ACM intl conference on Information and Knowledge management 2004, pp. 581-588.

\* cited by examiner

Ground Truth: "Barack Obama" "United States"
Source Text: ...President Barack Obama of the United States...
Extractor 1: "President Barack Obama" "the United States"
Extractor 2: "President Barack Obama of the United States"

FIG. 4

Source Text: "— President Obama and Edward M. Liddy of the American International Group—"

Extractor 1: "President Obama"    "Liddy of the American International"
Extractor 2: "Obama"    "Edward M. Liddy"    "American International Group"

FIG. 5

Pattern Dictionary

Observed Extracted Data Pattern → d: $\left\{ \begin{array}{c} (02110) \\ (21021) \end{array} \right\}$ Observed Ground Truths (tallied) → $H_1$: (21021) count: 4
$H_2$: (02002) count: 2
⋮

FIG. 8

Ground Truth: "*President Obama*" (21)

(A)   Extractor 1: "*President Obama*" (21)
     Extractor 2: "*President Obama*" (21)
     Extractor 3:      "*Obama*" (02)

(B)   Extractor 1: "*President Obama*" (21)
     Extractor 2: "*President Obama*" (21)

INFORMATION EXTRACTION SYSTEM

CROSS REFERENCE TO RELATED APPLICATIONS

The present application claims priority to U.S. Provisional Application No. 61/308,715, filed on Feb. 26, 2010, which is incorporated herein by reference in its entirety.

STATEMENT OF GOVERNMENT GRANT

This invention was made with government support under Contract No. DE-AC52-07NA27344 awarded by the United States Department of Energy to Lawrence Livermore National Security, LLC for the operation of Lawrence Livermore National Laboratory. The government has certain rights in the invention.

FIELD

The present disclosure relates to an information extraction system. In particular, it relates to an information extraction system for performing meta-extraction of name entities, relationships, and events.

BACKGROUND

Since the 1980s, increasing sophistication of machine learning and computer technologies has enabled development of solutions to a variety of challenges facing the Natural Language Processing (NLP) community. Knowledge discovery systems can be of interest to commercial, industrial, and government organizations that utilize computer processing to perform transactions, evaluate consumer demands, and, in general, draw conclusions or make decisions that depend upon a knowledge base. Often, construction of such a knowledge base depends upon automatic extraction of relational information and, more fundamentally, related named entities (e.g., people, organizations) from a collection, or corpus, of text documents (e.g., e-mail, news articles). Consequently, reliability of these systems is susceptible to extraction errors.

Even state-of-the-art extraction tools/technologies, also referred to as extractors, can be vulnerable to variations in (1) source and domain of a corpus and its adherence to conventional lexical, syntactical, and grammatical rules; (2) availability and reliability of manually annotated data; and (3) complexity of semantic object types targeted for extraction. Under these and other challenging conditions, extractors can produce a range of interdependent errors that can distort output and fail to achieve adequate accuracy rates for practical use. However, many extractors, distinguished by the nature of their underlying algorithms, possess complementary characteristics that may be combined to selectively amplify their attractive attributes (e.g., low miss or false alarm rates) and reduce their respective errors.

SUMMARY

According to a first aspect, an information extraction system is provided. The system comprises: a master device, configured to receive input data and experimental options; an extractor device, configured to transform input data into extractor output; an aggregator device, configured to aggregate extracted entities of the extractor output to form meta-entities, dispatch meta-entities to aggregation algorithms, form hypotheses for each meta-entity, calculate probability for each hypothesis, and reconstruct a truth entity based on each hypothesis; a storage device, configured to store input data, extractor output, and other files; and a communication device, configured to enable high bandwidth communication of data between the devices of the information extraction system.

According to a second aspect, an information extraction system is provided. The system comprises: a master module for receiving input data and experimental options; an extractor module, coupled to the master module, for transforming input data into extractor output; and an aggregator module, coupled to the extractor module, for aggregating extracted entities of the extractor output to form meta-entities, dispatching meta-entities to aggregation algorithms, forming hypotheses for each meta-entity, calculating probability for each hypothesis, and reconstructing a truth entity based on each hypothesis.

Further aspects are shown in the specification, drawings, and claims of the present application.

BRIEF DESCRIPTION OF DRAWINGS

The accompanying drawings and tables, which are incorporated into and constitute a part of this specification, illustrate one or more embodiments of the present disclosure and, together with the description of example embodiments, serve to explain the principles and implementations of the disclosure.

FIG. 4 shows an exemplary set of text data according to an embodiment of the information extraction system of the present disclosure. The set text data comprises two known entities within a training corpus of source text and the extracted entities extracted by two separate entity extractors from the training corpus of source text.

FIG. 5 shows an exemplary set of text data according to an embodiment of the information extraction system of the present disclosure. The set text data comprises a training corpus of source text and the extracted entities extracted by two separate entity extractors from the training corpus of source text. The overlapping extracted entities form two meta-entities of text as shown by the boxes.

FIG. 8 shows an exemplary pattern dictionary entry, based on pattern-based associations shown in FIGS. 6 & 7 according to on an embodiment of the information extraction system of the present disclosure.

FIG. 9 shows two separate sample extraction results and the related associated patterns according to an embodiment of the information extraction system of the present disclosure.

FIG. 10 shows a screen shot of a display interface of a master module running on a master device of FIG. 13 that can receive the extraction request according to an embodiment of the present disclosure.

APPENDIX

Figure 1:
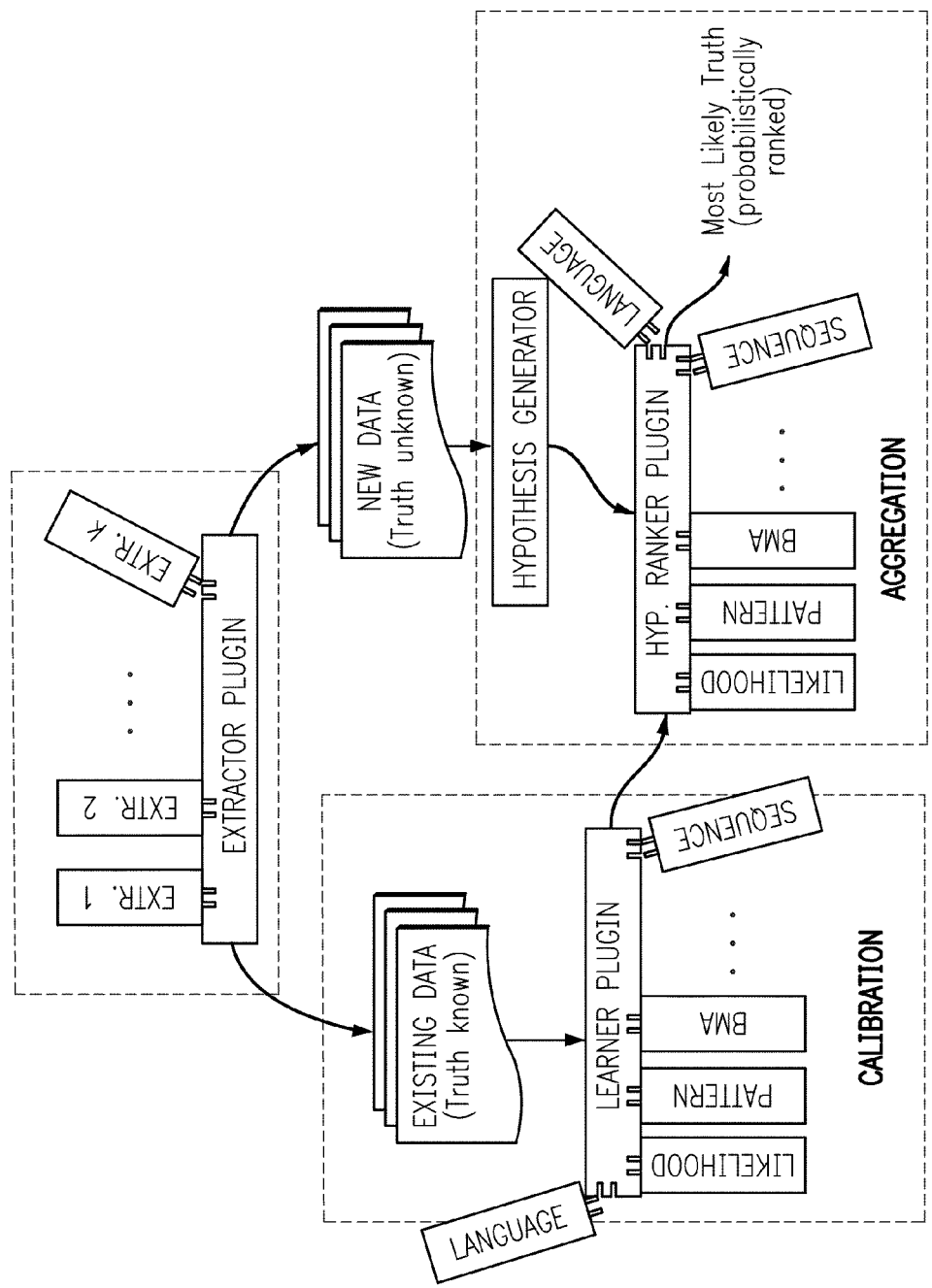
FIG. 1 shows an exemplary diagram of some of the components of the information extraction system according to an embodiment of the present disclosure.

Appendix 1, describing possible embodiments of the steps of the method according to the present disclosure, is enclosed herewith and forms integral parts of the specification of the present application.

DETAILED DESCRIPTION

Information extraction tools vary widely with respect to type of information they extract from text. Applicants describe an information extraction system (IES) designed to address three primary tasks: named entity extraction, relationship extraction (e.g., entity A is married to entity B), and event extraction (e.g., entities A, B, and C attended a meeting on Date X). Note that relationships can be regarded as simple events that only involve two entities. Although examples in the present disclosure are given for the case of entity extraction, the examples are applicable to relationship extraction and event extraction as well.

One way to address entities, relationships, and events can be as follows. The basic unit of aggregation would be the "event", which consists of multiple entities related by multiple relationships (e.g., Person X is married to Person Y, who is sister of Person Z, who works for corporation A . . . ). An entity is simply a trivial event, consisting of no relationships. A method to perform aggregation for events can be to perform aggregation as described herein for each constituent entity (e.g., to perform aggregation independently for Persons X, Y, and Z and corporation A), and then to use a simple majority rule approach to determine the correct relationships between them, along with appropriate probability estimates. For example, if two extractors say that Person X is married to Person Y, but a third extractor disagrees, one can note the extracted marriage relationship with a probability of $2/3$.

In an operational setting, the IES can be applied to benefit many industrial, commercial, consumer and/or governmental functions that make use of high quality entity extraction capabilities to effectively extract useful information that is dispersed in large quantities of text. The IES can be applied in many applications where text documents are investigated to extract cross references, identify similar articles, infer events and relationships, and predict possible events and relationships. The IES can potentially perform these functions with higher quality results, with more precision and fewer errors than with a single extractor.

For example, the IES can be utilized by a manufacturing company to improve its products or marketing strategies based on feedback from existing customers and to target potential future customers. For example, such feedback can be from a variety of sources such as the company's own web site, retailer websites (e.g. reviews from Amazon.com), direct email from customers, and standard mail from customers. The IES can be used to extract specific information such as demographics and locations of customers. Both actual and inferred information can be extracted and used by the manufacturing company to improve its products. For example, the company can extract the locations of its customers and infer from the locations that its customers primarily live in regions with snow in the winter. The company can then design a future product to have a large handle better suited for gloved hands based on the inferred operating condition in the snow, and can advertise its new product in the targeted regions.

As another example, search engines can utilize the IES to find related alternate search words to an initial search word, by looking for words that associated with the initial search word in texts.

It is noted that the methods and systems described in the present disclosure may be implemented in hardware, software, firmware, or combination thereof. Features described as blocks, modules, or components may be implemented together (e.g., as single integrated device) or separately (e.g., as several devices in one package The software portion of the methods of the present disclosure may comprise a computer-readable medium which comprises instructions that, when executed, perform, at least in part, the described method. The software portion of the methods of the present disclosure is adapted to run on a computer when executed. The computer-readable medium may comprise, for example, a random access memory, a non-volatile memory and/or a read-only memory. The instructions may be executed by a processor (e.g., a microprocessor (single or multi core), a microcontroller, a digital signal processor, an application specific integrated circuit, or a field programmable logic array).

A "computer" may refer to an apparatus or system capable of accepting a structured input, processing the structured input according to prescribed rules, and producing results of the processing as output. Examples of a computer may include: a stationary computer; a portable computer; a networked group of multiple computers; application specific hardware to emulate a computer and/or software; and an apparatus that may accept data, may process data in accordance with one or more stored software programs, may generate results, and typically may include input, output, storage, arithmetic, logic, and control units.

"Software" may refer to prescribed instructions to be operated by a computer or a portion of a computer. Examples of software may include: code segments; instructions; applets; pre-compiled code; compiled code; computer programs; and programmed logic.

A "network" may refer to a number of computers and associated devices that may be connected by communication facilities. A network may involve permanent connections such as cables or temporary connections such as those that may be made through telephone or other communication links. A network may further include hard-wired connections and/or wireless connections. Examples of a network may include: an internet, such as the Internet; an intranet; a local area network (LAN); a wide area network (WAN); and a combination of networks, such as an internet and an intranet.

For clarity purposes, the term "extractor" is used interchangeably with the terms "base extractor", "extraction tool", "information extraction tool", "entity extractor", and "extraction technology" and is defined as systems which operate to extract fragments from text that represent real-world entities, such as people, organizations, or locations.

For clarity purposes, the term "entity" is used interchangeably with the term "named entity" unless specifically stated otherwise. The term "entity" refers to people, organizations, or locations known by their names.

For clarity purposes, the term "truth" is used interchangeably with the terms "ground truth", "ground truth entity data", "known truth", and "known ground truth" and refers to a corpus or collection or set of true entities, or true named entities, or known entities such as those found in annotated training or evaluation corpus of text where the entities are detected, identified, and classified as, for example, discussed in subsection 1.1 of the section titled "Likelihood Algorithm."

Information Extraction System

With respect to a combination of entity extractors, many previous methodologies that aim to effectively leverage their respective strengths rely upon variations of a "voting" mechanism (e.g., majority vote as shown in reference [1], incorporated herein by reference in its entirety). In practice, such approaches toward combining results of different entity extractors may not be the most effective, as these approaches depend heavily upon number and type of extractors chosen and do not account for variations in the underlying extraction methodologies and the differing characteristics of their errors. Moreover, extraction systems utilizing such a combination tend to be limited in their ability to assess uncertainty, a capability related to evaluating reliability in downstream analysis and decision-making Proposed enhancements to the voting mechanism include, but are not limited to, weighting of constituent (e.g., base) extractors' output as shown in reference [2] (incorporated herein by reference in its entirety); stacking of base extractors as shown in references [3]-[5] (incorporated herein by reference in their entirety); establishing a vote "threshold" as shown in reference [6] (incorporated herein by reference in its entirety); and bagging as shown in reference [7] (incorporated herein by reference in its entirety). However, even more sophisticated techniques than those found in references [1]-[7], such as those described in reference [8] (incorporated herein by reference in its entirety), fail to adequately account for impact of text within a local neighborhood of a word of interest. A method based on the Conditional Random Field (CRF) model presented by Si, et al. in reference [9] (incorporated herein by reference in its entirety), demonstrated that performance is enhanced by incorporating the classification structure of nearby words.

Referring now to FIG. 1, shown therein is an information extraction system (IES) (200) in another embodiment of the present disclosure. The IES (200) has an extendable generalized plug-in architecture for the aggregation of extraction technologies and the IES (200) is differentiated from prior art extractor combination systems by at least the following characteristics.

Specifically, the IES (200) is equipped with a collection of novel aggregation algorithms that employ machine learning and probabilistic methods ranging from classical probability techniques to Bayesian Model Averaging, all of which will be discussed in detail later in the present disclosure. The IES (200) is specifically designed to enable new base extractors and aggregation algorithms to be readily "plugged in" to the IES (200) with minimal effort, to transform suboptimal extracted data into more reliable output for which uncertainty can be explicitly quantified.

Hardware

Figure 13:
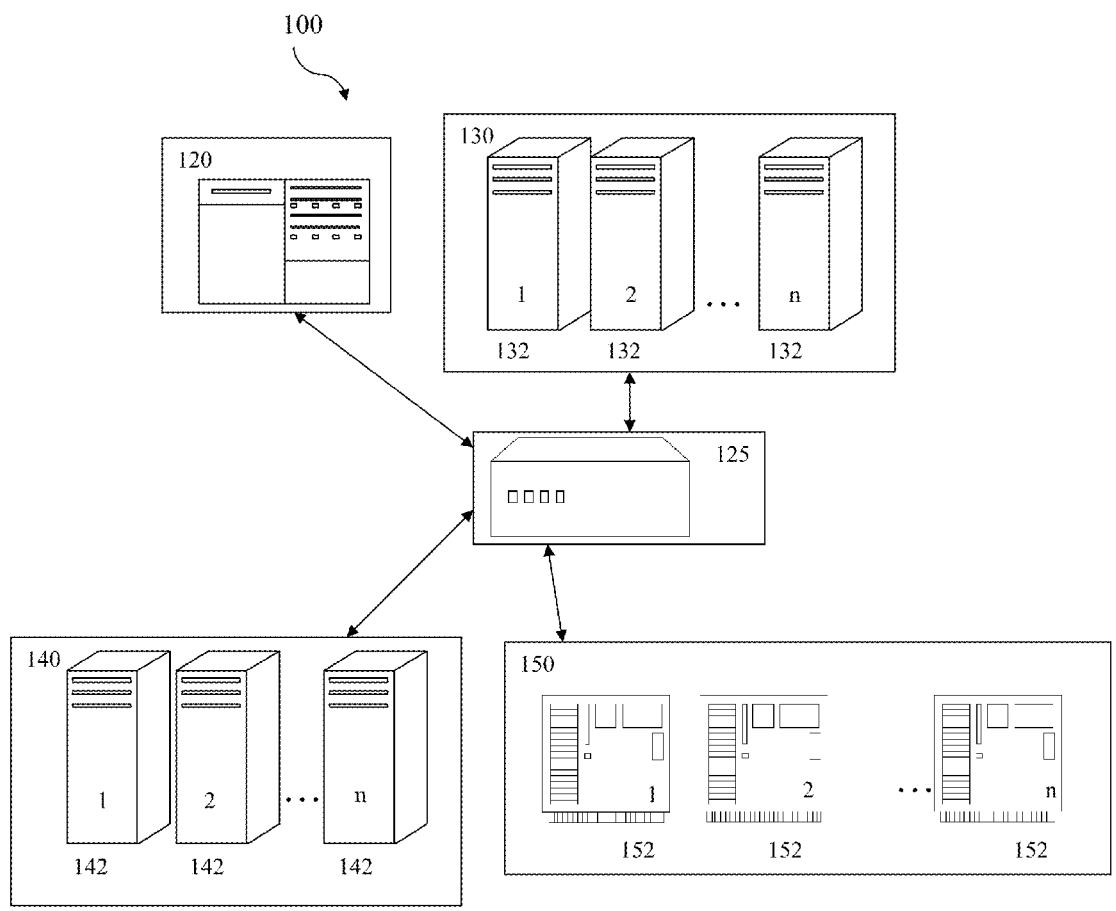
FIG. 13 shows an exemplary information extraction system with hardware devices according to an embodiment of the present disclosure.

Referring now to FIG. 13, therein is shown an information extraction system (IES) (100) according to an embodiment of the present disclosure. The IES (100) comprises a master device (120), an extractor device (130), a communication device (125), an aggregation device (140), and a storage device (150). The extractor device (130) can contain one or more extractor units (132), the aggregation device (140) can contain one or more aggregation units (142), and the storage device (150) can contain one or more storage units (152).

The operational speed of the IES (100) increases linearly with the number of hardware units for the extractor device (132) and aggregation device (142), and storage device (150) and can be implemented in a range of hardware unit enumeration commensurate to the amount of text processing capability desired in a particular application. The communication device (125) is configured to route information between the various devices (120, 130, 140, and 150) in the IES (100) with high bandwidth, or communication data capability, for effective communication between the various devices (120, 130, 140, and 150).

The communication device (125) can be any device and/or pathway which enable communication of a large amount of data (e.g., high bandwidth) between the various devices of the IES (100). For example, the communication device (125) can be an Ethernet router, a wireless router, a wired local area network, a wireless local area network, a mother board, wireless fidelity (Wi-Fi), worldwide interoperability for microwave access (WiMAX), or a combination thereof.

The various devices (120, 130, 140, and 150) of the IES (100) can be centralized in a single computer room, distributed across different rooms, distributed across different geographical locations, or embedded within a computer or computer network.

In one embodiment of the present disclosure, the IES (100) is a single desktop computer. The master device (120), the extractor device (130), and the aggregation device (140) are implemented by the single processor on the computer in time sequentially ordered stages. The mother board of the IES (100) would function as the communication device (125) between the processor and physical memory (RAM), while the mother board and drive controller together would be the communication device (125) for communicating between the processors and the storage device (150). The storage device (150) can be a magnetic hard drive or a solid state drive on the computer.

In another embodiment of the present disclosure, an IES (100) with better processing capability can contain a multiple rack-mounted computers and one or more high speed network storage appliances. The IES (100) in the embodiment can be located in a local area network using a common Ethernet router switch as the communication device (125) for fast communication between the various devices (120, 130, 140, and 150). Each extractor unit (132) of the extractor device (130) and each aggregation unit (142) of the aggregation device (140) as well as the master device (120) is a computer.

Common files can be shared between the processors by storing the files or documents and extractor output files in a storage device (150) commonly accessible to each of the processors via the Ethernet router functioning as the communication device (125). The storage device (150) can comprise one or more storage units (152) each of which holds the files and extractor output files. Each storage unit (152) can be a network storage appliance.

Each storage unit (152) can be specified for specific storage functions for better file segregation and access time. For example, long term storage for files archival purposes can be stored on one storage unit (152) while short term storage for files to be used within the near future, such as a current extraction, can be stored on another storage unit (152). Logically, the documents (and entities within the documents) can be kept as files and eventually stored in a database for long term use. It should be noted that keeping documents and entities within the documents as files can be problematic due to the large number of files involved unless a special file system is used. However, this option is helpful for 'staging' a day's processing because using files simplifies programming and is consistent with coding of the extractors.

It may be useful to keep the documents and entities together in the same storage device so the documents and entities can be searched in the future. In addition, some local storage may comprise a large physical hard drive located on each of the computers, which is especially convenient for staging each day's work or for storing training parameters that are to be used with each extraction.

The master device (120) is configured to manage the file locations and direct files and inquiries between devices. The master device (120) can also operate the display interface between the IES (100) and the outside world. As an example, the master device (120) can receive an input document and experiment options such as those shown in FIG. 10\through the display interface. As another example, the master device (120) can send to each extractor unit (132) the location of an input document file and the name of the new location to place its output (the documents can be split into groups with each group having an associated location). As yet another example, the master device (120) can send to each aggregation units (142) the locations (e.g., URL) of outputs from each extractor unit (132) and where to place the output of each aggregation units (142).

The master device (120) can be a single processor computer, a multi-processor computer, one of a plurality of processors on a computer, a single processor blade, a multi-processor blade, or one of a plurality of processors on a blade or a mother board. Each processor can contain single or multiple processor cores. An embodiment of the master device (120) is a single desktop computer connected to a group of rack-mounted computers that perform the other functions of the system, on a common network. The desktop computer has a keyboard, mouse, and monitor as the display interface.

The extractor device (130) is configured to execute the plurality of entity extractors to extract text fragments that represent real-world entities, such as people, organizations, or locations from the input data of text documents. In one embodiment of the present disclosure, the extractor device (130) can comprise a plurality of extractor units (132) wherein each extractor unit (132) can be a processor that runs a particular extractor on a stream of documents. An embodiment is a group of rack-mounted computers, each one performing as a single extractor unit.

Each extractor unit (132) can be a single processor computer, a multi-processor computer, one of a plurality of processors on a computer, a single processor blade, a multi-processor rack-mounted computer, or one of a plurality of processors on a rack-mounted computer or a mother board. Each process can contain single or multiple processor cores. Each extractor unit (132) may or may not have local data storage.

The aggregation device (140) is configured to execute a plurality of aggregation algorithms to reconstruct the truth entity from each meta-entity formed from aggregating the extracted entities from a plurality of entity extractors. The aggregation device (140) can comprise one or more aggregation units (142) to execute the plurality of aggregation algorithms on the output of the extractor units (132).

Each aggregation unit (142) can be a single processor computer, a multi-processor computer, one of a plurality of processors on a computer, a single processor rack-mounted computer, a multi-processor rack-mounted computer, or one of a plurality of processors on a rack-mounted computer or a mother board. Each processor can contain single or multiple processor cores. Each aggregation unit (142) may or may not have local data storage. An embodiment is a group of rack-mounted computers, each one performing as a single aggregation unit.

The master device (120), the extractor device (130), the communication device (125), the aggregation device (140), and the storage device (150) together form an embodiment of the IES (100).

Calibration and Aggregation

Figure 2:
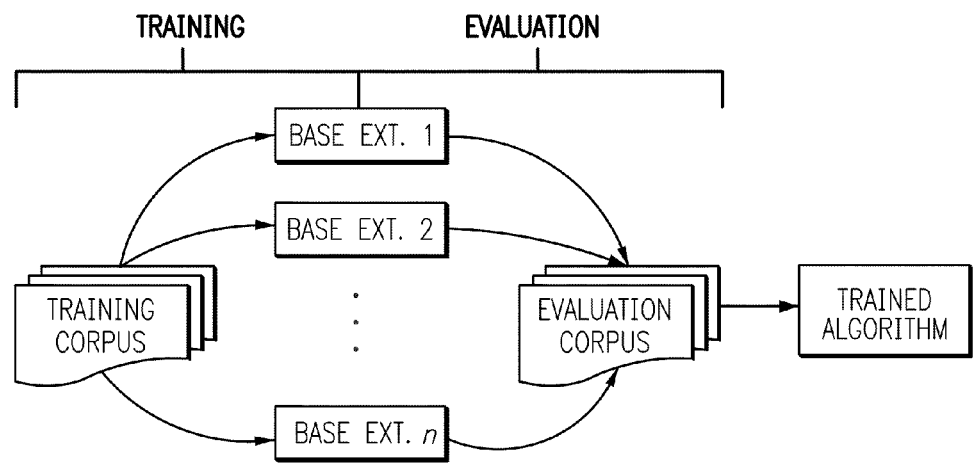
FIG. 2 shows an exemplary diagram according to an embodiment of the information extraction system of the present disclosure conducting calibration.
Figure 3:
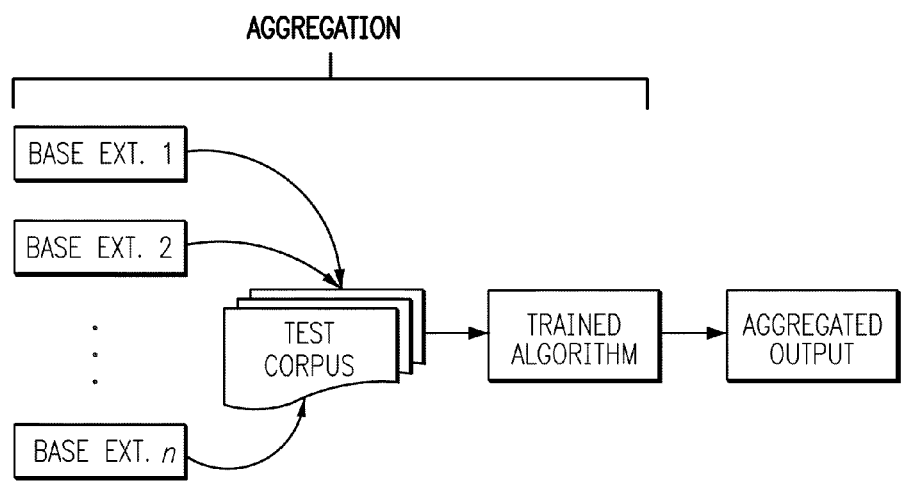
FIG. 3 shows an exemplary diagram according to an embodiment of the information extraction system of the present disclosure conducting aggregation or operation.

Each individual aggregation algorithm—utilizing its own unique underlying models and/or assumptions—comprises a calibration component as shown in FIG. 2 coupled with an aggregation component utilizing the trained aggregation algorithm as shown in FIG. 3. An aggregation algorithm becomes a trained aggregation algorithm once the IES has been calibrated and can perform one or more further aggregations or use in a standalone fashion without repeating the calibration with each aggregation.

Figure 14:
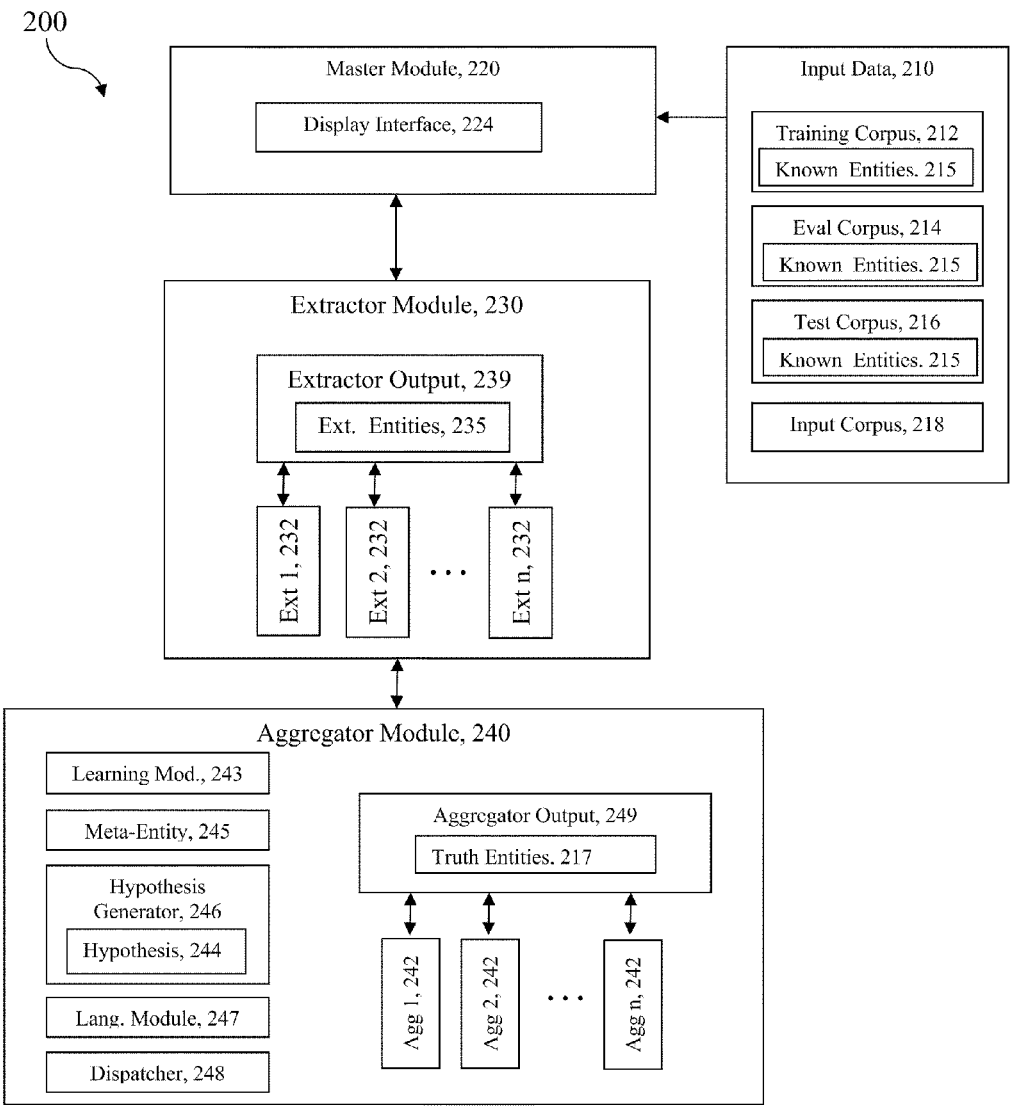
FIG. 14 shows an exemplary information extraction system with modules according to an embodiment of the present disclosure.

Referring now to FIG. 14, therein is shown an IES (200) according to an embodiment of the present disclosure. The IES (200) comprises a master module (220), an extractor module (230), and an aggregator module (240). The extractor module (230) comprises a plurality of extractors (232) and the aggregator module (240) comprises a plurality of aggregation algorithms (242), a learning module (243), a hypothesis generator (246), a language module (247), and a dispatcher module (248).

The IES (200) can accept input data (210) of texts. The input data (210) can comprise of training corpus (212), evaluation corpus (214), and testing corpus (216), each of which comprise annotated text with known entities (215) to be used for various stages of calibration and testing of the IES (200). In operation, input corpus (218) without annotation can be the input data (210) for the calibrated IES (200).

Figure 10:
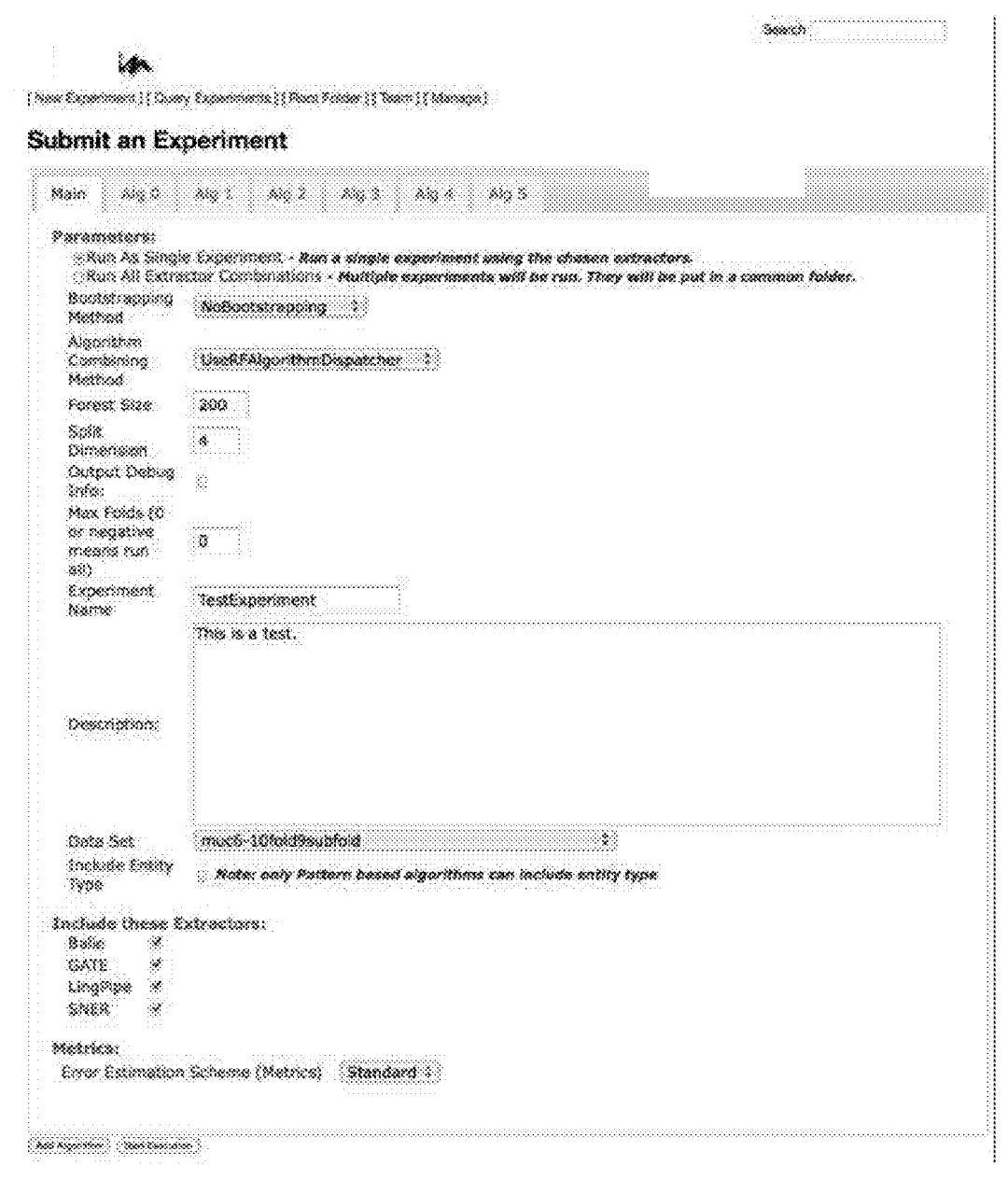
Figure 11:
FIG. 11 shows a screen shot of the display interface of the master module that can receive the extraction request with the manual dispatcher according to an embodiment of the present disclosure.
Figure 12:
FIG. 12 shows a screen shot of the display interface of the master module that can receive the extraction request with the algorithm specification according to an embodiment of the present disclosure.

The master module (220) is for the management of the file locations and direct files and inquiries between devices. The master module (220) also operates the display interface (224) between the IES (200) and the outside world and allows the IES (200) to be accessible remotely through a network such as an intranet or the Internet. As an example, the master module (220) can receive an input document and experimental options through a user interface (224) in the master module (220). FIGS. 10, 11, and 12 show examples of the display interface (224) of the master module (220).

With reference back to FIG. 14, the extractor module (230) is coupled to the master module (220) and executes the plurality of entity extractors (232) to extract fragments or extracted entities (235) that represent real-world entities, such as people, organizations, or locations from the text. Each entity extractor (232) has its own technology or algorithm and extracts entities (235) from the text independently of each of the other entity extractors (232). The set of extracted entities (235) from each entity extractor (232) is referred to as the extractor output (239), which is sent to the aggregator module (240).

The aggregator module (240) is coupled to the extractor module (230) and receives receiving the extractor output (239) and executes the plurality of aggregation algorithms (242) on the extractor output (239) during operation. Each aggregation algorithm (242) operates independently of other aggregation algorithms (242) to reconstruct the truth entity (217) from each meta-entity (245) formed from aggregating the extracted entities (235) from the plurality of entity extractors (232).

Operation of the IES (200) begins by calibration or training of the IES (200) by the learning module (243) of the aggregator module (240). Training the IES (200) includes estimation of probability distributions over a joint hierarchical error space, which may be defined by the user, determined by the plurality of entity extractors (232) relative to a training corpus (212) of entity annotated texts. The plurality of entity extractors (232) are trained with the training corpus (212) where the entity extractors (232) are characterized by their output only. The plurality of trained entity extractors (232) are then utilized to calibrated each aggregation algorithm by utilizing a corresponding evaluation corpus (214) of annotated text.

There are several methods which may be utilized to calibrate the IES (200), by annotated text, especially with consideration to reducing data bias. Applicants note that at least two disjoint corpora of annotated text, a training corpus (212) and an evaluation corpus (214), would be needed for any of these methods of calibration. Each corpus of annotated text is a collection of documents with the known entities (215) manually marked or noted. The two disjoint corpora of annotated text, the training corpus (212) and the evaluation corpus (214), would not share any common documents. The training corpus and evaluation corpus may each be of arbitrary size, but usually the training corpus would be of the same or larger size compared to the evaluation corpus. This is true for both bootstrapping and cross-validation methods discuss below.

One such method of calibration for the IES (200) is bootstrapping, which consist of choosing a training corpus (212) from the body of annotate documents randomly to be used to train the plurality of entity extractors (232), then collecting all of the remaining annotated documents to serve as the corresponding evaluation corpus (214) to the training corpus (212) for the calibration of the aggregation algorithms. The resulting error space would be characterized.

The calibration is repeated multiple times, each time with 1) a new randomly chosen training corpus from the same body of annotated documents, 2) a new corresponding evaluation corpus (214) to that new randomly chosen training corpus (212), and 3) a new resulting error space characterization. The resulting error space characterizations from all of the iterations of calibration can be combined (for example, by averaging) and used for the calibration of the IES (200), thus reducing the data bias that can be produced by any single calibration.

Another method of calibration for the IES (200) is cross-validation. In cross-validation calibration, like other calibration methods, the training corpus would be disjoint from the corresponding evaluation corpus (214) of annotated text such that there is no overlap between the two corpora. For example, given 4 subsets of annotated text data, {1,2,3, & 4}, the following combinations of training corpus (212) and corresponding evaluation corpus (214) can be created: {1,2,3} & {4}, {1,2,4}&{3}, {1,3,4}&{2}, and {2,3,4}&{1}, such that the training corpus (212) and corresponding evaluation corpus (214) are disjoint and that each subset is utilized for evaluation the same number times. By combining (for example, via averaging) the error space characterization created by each of all of the available combinations of corpora shown above, a calibration of the IES (200) can be conducted with reduced data bias than if just a single combination of corpora is used for calibration. The cross-validation method of calibration for the IES (200) is preferred by the Applicants for the IES (200) of the present disclosure.

The probability distributions over error space effectively characterize each extractor's performance (quantified via standard NLP metrics) relative to disjoint regions of contiguous text called meta-entities (245) formed by aggregating the extracted entities (235) from the plurality of entity extractors (232). This performance characterization by the learning module (243) may take into account joint extractor characteristics as well as the statistical behaviors of the errors occupying the defined error space.

Calibration or training of the IES (200) also comprises construction and calibration of a dispatcher (248) of the aggregator module (240). The dispatcher (248) addresses variations of performance of these individual aggregator algorithms (242), depending upon their different underlying models and/or assumptions as well as on the (potentially unknown) nature of the source text. Such variations have been observed by the Applicants in practice.

For example, under sparse data conditions, which are common in real world applications, aggregation algorithms that utilize more complex models have the potential to perform poorly. Accordingly, in the final stage of its calibration, the IES (200) can construct the dispatcher (248) that employs machine learning methods (e.g., Random Forest, logistic regression) to determine an optimal aggregation strategy for incoming meta-entities (245), relative to a collection of defined features (e.g., meta-entity length and complexity). In this fashion, the IES (200) is able to take advantage of conditions under which data are plentiful, but may divert aggregation to a more robust aggregation algorithm (242) otherwise.

When the IES (200) encounters newly extracted output (239) in the field, such as in the stand-alone aggregation (e.g. use or operation), the aggregation module (240) of the IES (200) forms disjoint regions of contiguous text called meta-entities (245) by aggregating the extracted entities (235) from the plurality of entity extractors (232). The hypothesis generator (246) of the aggregation module (240) of the IES (200) then constructs a space of ground truth hypotheses (244) for each meta-entity (245) formed.

The dispatcher (248) of the IES (200) then deploys the meta-entity (245) to the optimal aggregation algorithm (242), determined via the calibration phase, which then assigns a probability to each hypothesis (244). These hypotheses (244) are finally ranked according to those probability assignments and presented to the user. Applicants observe that in many settings, the IES (200) has been shown to produce aggregated output (249) which are (1) statistically significant improvements in extraction relative to standard performance metrics and (2) able to reconstruct the truth entity when all of its individual constituent entity extractors (232) fail, both supporting the efficacy of the IES (200) of the present disclosure.

Since the IES (200) does not require any knowledge of the underlying algorithms employed by existing extractors (232) (e.g., commercial), proprietary or other "black box" systems may be readily plugged in to enhance the quality of aggregator output (249). Additionally, the IES (200) has been designed to enable the plug-in of new aggregation algorithms (242), as well as comprising a language module (247) that can leverage language-specific resources such as gazetteers, stop word lists, parsers, etc. This level of flexibility can make the IES (200) customizable and adaptable to a wide range of applications and problem domains. Finally, note that the resulting relative ranking of hypotheses (244) for each meta-entity (245) can provide not only an ordered list of the most probable ground truths, but a mechanism for determining those hypotheses (244) that can be more likely in a statistical sense. Thus, the ranking can provide information for use in downstream decision-making and analysis by enabling confidence assessments of aggregator output (249).

The IES (200) of FIG. 14 can be implemented utilizing the physical system of the IES (100) of FIG. 13. The master module (220) can use the master device (120) of FIG. 13, the extractor module (230) can use the extractor device (130) of FIG. 13, and the aggregator module (240) can use the aggregator device (140) of FIG. 13. In addition, the master module (220), the extractor module (230) and the aggregator module (240) can each use the storage device (150) of FIG. 13 for the storage and retrieval of data and the communication device (125) for communication with other devices and the outside world.

Likelihood Algorithm

1 Base Extractor Performance

In the remaining discussion, Applicants define an entity as a string (e.g., name) associated with a location in the source text. Note that within the present disclosure, Applicants express the location of a text string in terms of its start and end offsets relative to the first character in the corpus. To enable the characterization of base extractor (232) performance, an annotated set of documents is available (distinct from those used for training) to serve as an "evaluation corpus (214)" for the base extractors (232). Three distinct corpora may be used for: (1) training the base extractors, (2) evaluating their performance, (3) testing the meta-extractor.

The ground truth entity data, G, consists of the set of true (e.g., manually annotated) known entities (215) identified in the evaluation corpus (214). The meta-extractor or aggregation algorithm (242) aggregates the output of K>1 base entity extractors (232), where $D_k$ denotes the output (239) of extractor k relative to a corpus. When the locations of a ground truth (215) and extracted entity (235) intersect, Applicants say that the entities overlap. Within the present disclosure, Applicants generally assume that ground truth entities do not overlap and that the entities extracted by extractor k do not overlap.

1.1 Transformations of Entity Data

Entity extractors (232) are generally of three basic types: rule-based, statistical and heuristic. Despite their algorithmic differences, however, their common objective is to correctly extract fragments from text that represent real-world entities, such as people, organizations, or locations. At a high level, this task may be regarded as a three-stage process in which an extractor (in some prescribed order) should detect a reference to an entity in a document, identify the offsets that delineate the name of a detected entity, and classify it as to its type.

Many of the most effective extractors (232) are proprietary, and hence, direct analysis of their underlying algorithms is often infeasible. Therefore, Applicants choose to treat each extractor k as a "black box". However, mistakes that are made on an annotated corpus result in observable discrepancies between its output, $D_k$, and the known ground truth, G. Thus, G serves as a baseline relative to which extractor behaviors can be characterized. More formally, the extraction process can be regarded as a transformation from G to $D_k$, denoted by $\tau(G, D_k)$, that is driven by the occurrence of extraction errors. Hence, assessing the performance of a base extractor (232) lies in characterizing the types and propensity of the errors driving this transformation. Unfortunately, G and $D_k$ can be very large, so it is prudent to decompose $\tau(G, D_k)$ into an ordered collection of smaller, more manageable (e.g., elementary) transformations; e.g., $\tau(G, D_k) \equiv \{\tau_i(G_i, D_{ki})\}$, where $G_i$ and $D_{ki}$ are subsets of G and $D_k$ respectively.

The elementary transformations $\tau_i$ occasionally assume complex forms. In FIG. 4, for example, the output of Extractor 2 corresponds to a transformation of two ground truth entities into one extracted entity. Therefore, we choose to define the $\tau_i$'s in terms of the number of ground truth and extracted entities that they involve, subject to a desired set of properties. We now specify these properties more formally.

Let $\tau_i(G_i, D_{ki}) \equiv \tau^{m,n}$ exactly when $G_i$ is an ordered set of $m \geq 0$ consecutive ground truth entities and $D_{ki}$ is an ordered set of $n \geq 0$ consecutive extracted entities from extractor k, where at least one of m and n is strictly positive. The set of allowable types forms a transformation space given by $T=\{\tau^{m,n}: m,n \geq 0, m+n>0\}$. For a set of elementary transformations $\{\tau_i(G_i, D_{ki})\}$ that comprise $\tau(G, D_k)$, Applicants specify that the following hold:

1) For all $g \in G$, there is exactly one $\tau_i(G_i, D_{ki})$ such that $g \in G_i$; similarly, for all $d \in D_k$, there is exactly one $\tau_j(G_j, D_{kj})$ such that $d \in D_{kj}$;
2) If $g \in G$ and $d \in D_k$ overlap, then there exists some $\tau_i(G_i, D_{ki})$ such that $g \in G_i$ and $d \in D_{ki}$;
3) Any $\tau_i(G_i, D_{ki})$ cannot be partitioned into two or more transformations satisfying both (1) and (2).

Under these properties, the entities extracted by Extractors 1 and 2 in FIG. 4 correspond to two $\tau^{1,1}$ transformations and one $\tau^{2,1}$ transformation, respectively. $\tau^{0,0}$ refers to the transformation involving no true or extracted entities at a corpus location. This event is not directly observable or easily characterized.

It can be easily shown that properties (1)-(3) are necessary and sufficient to determine a unique collection of elementary transformations that partition $\tau(G, D_k)$, a desirable condition to ensure consistent meta-extractor performance. However, the space of $\tau^{m,n}$ transformation types is massive, and transformations become rarer as m and n become large. Hence, from a practical perspective, annotated data may be too sparse to compute reliable probability estimates over an unabridged transformation space. To that end, Applicants relax property (1) above so that Applicants can further decompose rare transformation types into a combination of simpler, overlapping transformation types that are more frequently observed. Care should be taken to ensure that the partition derived from a reduced space of transformation types is unique. Applicants have typically limited the space to $T=\{\tau^{0,1}, \tau^{1,0}, \tau^{1,1}, \tau^{1,2}, \tau^{2,1}\}$.

Many of these elementary transformations, e.g., $\tau^{m,n}$, $m \neq n$, encapsulate a variety of common extraction errors. For example, an extractor (232) may detect one entity where there are, in fact, three. Since these types of errors are implicitly accounted for via the transformation space, Applicants can think of these as implicit errors (which, notably, include the Miss and False Alarm errors, $\tau^{1,0}$ and $\tau^{0,1}$, respectively). However, observe that the $\tau^{2,1}$ transformation in FIG. 4 contains additional discrepancies between the true (215) and extracted entities (235) that the transformation type does not embody. Specifically, the output of Extractor 2, "President Barack Obama of the United States", includes the extra text "President" and "of the". These and other discrepancies within instantiated transformations can be regarded as explicit errors and are mapped into a set of error types, $E=\{e_1, e_2, \ldots, e_s\}$, called an error space.

1.2 The error space

Though Applicants place no specific constraints on the cardinality of the error space, the granularity of E should be considered. That is, a coarse error space may prevent subtle extractor behaviors from being adequately characterized, but an error space that is too fine may cause probability estimation to be problematic when annotated data are sparse.

To illustrate these concepts, suppose Applicants define the space of discrepancies to consist of all possible ways that "extra characters" can corrupt an entity name. Then the three spaces defined in Eq. (1) each constitute a valid error space.

$(E_1) e =$ "extra characters"

$(E_2) e_f =$ "extra characters name", $e_r =$ "name+extra characters"

$(E_3) e_{l_i} =$ "i extra characters+name", $i=1,2,\ldots,k$ $e_{r_i} =$ "name+i extra characters", $i=1,2,\ldots,k$ \qquad (1)

Observe that the respective cardinalities of $E_i$ in Eq. (1) are given by $|E_1|=1$, $|E_2|=2$, and $|E_3|=2k$. In the empirical studies presented in Section 4, Applicants have utilized an error space defined as in Eq. (2).

$e_x =$ "extra characters", $e_m =$ "missing characters" \qquad (2)

Ultimately, the choice of an appropriate mapping (and hence, E) may be influenced by many factors that depend upon the application in question and its associated parameters. However, as mentioned above, the amount of annotated data available for estimating probability distributions over transformation and error types (e.g., implicit and explicit errors) will likely play a critical role.

1.3 Error Probability Estimation

For each base extractor (232) k, Applicants should estimate a probability distribution over a transformation space, T, and an error space, E. At a high level of abstraction, T and E are related hierarchically; that is, explicit errors occur within observed transformations, and it is natural to exploit this dependency. Specifically, Applicants compute the relative frequency of each transformation type in the evaluation corpus, along with the relative frequency of each error conditioned on transformation type. In determining the latter, an explicit error of type $e_j \in E$ may occur more than once in conjunction with a transformation (depending on E and T). However, Applicants make the simplifying assumption that within an observed elementary transformation, explicit errors of different types may co-occur, but those of the same type may not. In the empirical studies of the present disclosure, Applicants found that relaxing this assumption generally had negligible impact on meta-extractor performance. Accordingly, Applicants say the state of each explicit error is binary, and is given by $$s_{\tau_i}(e_j) = \begin{cases} 1 & \text{if } e_j \text{ occurs within } \tau_i \\ 0 & \text{otherwise} \end{cases} \qquad (3)$$

$$s_{\tau_i}(E) = \{s_{\tau_i}(e_j)\}_{e_j \in E}, \tau_i \in T_k$$

where $T_k = \{\tau_i(G_i, D_{ki})\}$ is the set of elementary transformations that form $\tau(G, D_k)$, and $s_{\tau_i}(E)$ is the joint state of all defined error types within $\tau_i(G_i, D_{ki})$.

To exemplify this concept, suppose Applicants observe the $\tau^{1,1}$ transformation "Barack Obama"→"when Barack Obama was elected". No implicit errors are associated with this transformation type, but the set of explicit errors that occur relative to error space $E_1$ in Eq. (1) is $\{e\}$. Similarly, for $E_2$, $\{e_f, e_r\}$; and for $E_3$, $\{e_{l_5}, e_{r_{12}}\}$. Applicants can estimate the conditional probabilities of the explicit error types in E for extractor k via the expression $$\hat{P}_k(e_j | \tau^{m,n}) = \frac{\sum_{\tau_i \in T_k} s_{\tau_i}(e_j | \tau^{m,n})}{\sum_{\tau_i \in T_k} I_{\tau_i}(\tau^{m,n})}, e_j \in E \qquad (4)$$

where $I(\cdot)$ is the indicator function, $\tau^{m,n} \in T$ is a given transformation type, and $s_{\tau_i}(e_j|\tau^{m,n})$ and $I_{\tau_i}(\tau^{m,n})$ are defined to be 0 if transformation $\tau_i$ is not of type $\tau^{m,n}$. Similarly, the probability estimate for each transformation type is given by $$\hat{P}_k(\tau^{m,n}) = \frac{\sum_{\tau_i \in T_k} I_{\tau_i}(\tau^{m,n})}{|T_k|}, \tau^{m,n} \in T. \qquad (5)$$

Note that there are a variety of alternative estimates that one might propose. Those defined in Eq. (4) and Eq. (5) were chosen for their computational simplicity and because they provide reasonable estimates of the quantities of interest assuming modest amounts of data.

2 Extractor Aggregation

In this section, Applicants present a technique for aggregating base extractor output that leverages their performance characteristics to probabilistically rank hypothesized entities. This ranking forms the basis for determining meta-extractor output and associated confidence.

2.1 Meta-Entities

In an operational setting, the base extractors (232) are applied to an input corpus (218) for which ground truth is unknown. Using only the extracted output (239) of its K base extractors (232), the meta-extractor should determine the truth, G. To address efficiency parameters of certain real-world applications, one can assume within the present disclosure that the source text cannot directly be accessed.

Lacking access to the source text, the overlapping entities extracted by all of the base extractors (232) at a given location in the corpus contain all the available information regarding the underlying ground truth at that location. The union of this overlapping extracted data yields a meta-entity (245), a novel construction used to establish a space of hypothesis (244) associated with this ground truth (217). FIG. 5 provides an excerpt of source text overlaid with the output (239) of two hypothetical extractors (232), whose extracted data form two meta-entities (245).

2.2 The Hypothesis Space

Applicants assume that any true entities should lie strictly within the corresponding meta-entity boundaries. Given this assumption, it only remains to determine the unique combination of words in the meta-entity that exactly matches these entities. To this end, Applicants construct a hypothesis space or space of hypothesis (244) that consists of all possible forms the ground truth entities (217) may take. For example, the "President Obama" meta-entity (245) in FIG. 5 yields a hypothesis (244) space consisting of the following:

1) "President Obama"
2) "President", "Obama"
3) "President"
4) "Obama"
5) " " (e.g., the NULL hypothesis)

For small meta-entities (245) it is feasible to generate the hypothesis (244) space exhaustively. However, the space grows exponentially with meta-entity size and may be pared down by means of prior knowledge and/or assumptions. Such size constraints have not significantly impacted performance in Applicants' empirical studies.

Furthermore, the assumption that the ground truth entities (217) lie entirely within the meta-entity boundaries does not always hold and may at first seem unreasonable. Indeed, when this assumption does not hold, the hypothesis space generated from the meta-entity (245) will not contain the truth, and Applicants say that the hypothesis space is not closed. In such cases, the meta-extractor (extraction system (200)) will be unable to discover the truth.

Note, however, that the closure rate of the hypothesis space is closely related to the number and diversity of the base extractors (232), the closure rate being defined herein as the relative frequency with which hypothesis spaces contain the corresponding truth. In Applicants' empirical studies, utilizing four very different open source entity extractors (232), the truth was contained in the hypothesis space as often as 98% of the time. This finding suggests that for practical purposes, Applicants' assumption may, in fact, be reasonable. Strategies for increasing the closure rate include expanding the collection of base extractors (232), or enabling access to the source text during hypothesis space generation.

2.3 Ranking Hypotheses

Given the hypothesis space $\Omega_x$ corresponding to a meta-entity (245) x and the overlapping output $D_{kx}$ of base extractor k, the likelihood of each hypothesis (244) $H_{jx} \in \Omega_x$ should be computed. Under the assumption that $H_{jx}$ is true, and provided the transformation and error spaces are appropriately defined, there is a unique set of transformations $T_{jk}$ and associated explicit errors that transforms $H_{jx}$ into $D_{kx}$. This is called the error pathway between the hypothesis (244) and the extracted data. For example, let Applicants' hypothesis (244) be $H_j$: "President", "Obama" in reference to meta-entity (245) "President Obama" from FIG. 5. Based on the assumption that $H_j$ is true, the pathway generated by Extractor 1 consists of a $\tau^{2,1}$ transformation with no explicit errors, whereas that generated by Extractor 2 consists of $\tau^{1,1}$ and $\tau^{1,0}$ transformation with no explicit errors. Since each hypothesis (244) induces a unique pathway, computing its likelihood reduces to estimating the probability of observing this pathway.

Hence, the likelihood of each hypothesis (244) can be expressed as a function of the probabilities estimated as described in Section 2.3. Let $H_{jx} \in \Omega_x$ be the hypothesis (244) of interest and $D_x = D_{1x} \cup D_{2x} \cup \ldots \cup D_{Kx}$ be the corresponding (e.g., overlapping) data extracted by the K base extractors (232). Applicants estimate the conditional probability of $H_{jx}$ given the observed extracted data $D_x$, via the following expression:

$$P(H_{jx} \mid D_x) \propto P(D_x \mid H_{jx}) \cdot P(H_{jx}) = \quad (7)$$
$$P(D_{1x}, D_{2x}, \ldots, D_{Kx} \mid H_{jx}) \cdot P(H_{jx}),$$

Where $P(D_{1x}, D_{2x}, \ldots, D_{Kx} \mid H_{jx})$ is the joint conditional probability of the extracted data produced by the base extractors (232), and the prior probability of $H_{jx}$ is given by $P(H_{jx})$. If desired, Eq. (7) can be simplified via various assumptions, such as assuming a uniform prior over $H_{jx} \in \Omega_x$ and/or statistical independence of the base extractors (232), transformations and errors. Additionally, due to the data sparseness associated with many real-world applications, Applicants have assumed independence of the extractors (232) and transformations, as well as conditional independence of the explicit errors. Based on these assumptions, $P(H_{jx} \mid D_x)$ can be expressed as follows:

$$P(H_{jx} \mid D_x) \propto P(D_{1x}, D_{2x}, K, D_{Kx} \mid H_{jx}) = \prod_{k=1}^{K} (P(D_{kx} \mid H_{jx})) \quad (8)$$

where $$P(D_{kx} \mid H_{jx}) = \prod_{\tau_i \in T_{jk}} \sum_{\tau^{m,n} \in T} P_k(s_{\tau_i}(E) \mid \tau^{m,n}) P_k(\tau^{m,n})$$

$$P_k(s_{\tau_i}(E) \mid \tau^{m,n}) = \prod_{e_j \in E} P_k(s_{\tau_i}(e_j) \mid \tau^{m,n})$$

and $P_k(s_{\tau_i}(E) \mid \tau^{m,n}) = 0$ if transformation $\tau_i$, is not of type $\tau^{m,n}$.

The null hypothesis, $H_{0x} = \emptyset$, is a special case and is handled slightly differently. Given that $H_{0x}$ is true, the error pathway associated with the output of each base extractor (232) will be composed of either $n > 0$ $\tau^{0,1}$ transformations or one $\tau^{0,0}$ transformation. Though Applicants do not directly estimate $P_k(\tau^{0,0})$ for the base extractors (232), $\tau^{0,1}$ and $\tau^{0,0}$ are disjoint and are the only transformation types that can occur under this assumption. Hence, $\hat{P}_k(\tau^{0,0}) = 1 - \hat{P}_k(\tau^{0,1})$ constitutes a reasonable estimate.

Once each likelihood has been computed, the hypothesis (244) can be ranked accordingly. In simple applications of the meta-extraction methodology of the information extraction system (200) the "winning" hypothesis (244) may be accepted as the truth. However, the probabilistic ranking enables the quantification of uncertainty associated with the entity data. Moreover, it presents a framework for considering the top n competing hypotheses (244), or all hypotheses whose probabilities exceed a specified threshold. Effective strategies that exploit this ranking may yield significant rewards since, in Applicants' studies; the three highest ranked hypotheses contained the truth as often as 94.5% of the time. Ultimately, the choice of how to leverage the ranking depends upon the capabilities of the system utilizing this method and the particular application domain.

2.2 Reconstructing the Truth

In practical applications, standard metrics do not reflect the full range of advantages the meta-extractor of the information extraction system (200) provides. The construction of a hypothesis space that contains all possible forms of ground truth (217) allows the meta-extractor to generate a ranking where the "winning" hypothesis is correct, even if the base extractors (232) and the majority vote algorithm fail.

Table 1 presents an example of this phenomenon derived from the MUC 6 data set, in which all four base extractors incorrectly extracted portions of "Valley Federal Savings and Loan Association". There were 233 hypotheses in the hypothesis space. Majority voting fails in this instance. Naive voting methods favor the output of two entity extractors (232) referred to as "GATE" and "SNER", which are in complete agreement, and weighted voting methods might favor SNER, since it has been the most effective under ideal conditions. However, the meta-extractor correctly determined, based upon the performance profiles of its base extractors (232), that "Valley Federal Savings and Loan Association" was the most likely truth, with a probability of 0.333. The second most likely hypothesis matched the output of GATE and SNER and had a probability of 0.214.

TABLE 1

RECONSTRUCTING THE TRUTH

| Extractor | Extracted Entity 1 | Extracted Entity 2 |
|---|---|---|
| BALIE | "Federal Savings" | "Association" |
| GATE | "Valley Federal Savings" | "Loan Association" |
| LingPipe | "Valley" | "Federal Savings and Loan Association" |
| SNER | "Valley Federal Savings" | "Loan Association" |
| Meta | "Valley Federal Savings and Loan Association" | |

3 Conclusions

The Likelihood Algorithm yields statistically significant improvements over its base extractors (232) with respect to conventional summary metrics, exceeding the capabilities of a majority vote. In particular, it has demonstrated the ability to largely mitigate degradation due to operating conditions in which proper training of the base extractors is either computationally impractical or impossible. Moreover, Applicants have observed that the constructed hypothesis space, when based on the output of the four extractors (232) combined in this work, contains the truth as much as 98% of the time, and that the truth is contained in the top three ranked hypotheses as often as 94.5% of the time. This suggests that additional value may be achieved if the ranking can be exploited to its full potential.

Interestingly, the Likelihood Algorithm exhibits the ability to determine the underlying ground truth when all of its base extractors produce corrupted output. This capability provides obvious value to real-world applications, since highly corrupted entity data are a common occurrence when faced with the challenges associated with real data.

Important considerations in the application of this method to real-world problems motivated certain independence assumptions in the likelihood computation. Though the meta-extractor has successfully demonstrated that this aggregation methodology can be highly effective, Applicants expect that, in general, these assumptions will seldom hold, and in some cases there may be a negative impact on meta-extractor performance. However, Applicants conjecture that a joint probability model over the extractors, transformations and errors, though potentially more effective under data-rich conditions, would rapidly degrade when data are sparse. The simpler model may be more robust to these challenges and ultimately more practical in an operational setting. In light of these considerations, however, extending the meta-extractor to leverage joint information when sufficient annotated data are available may be justified.

4 Incorporating Entity Type into LA

Applicants first make four assumptions:

1. Entity type information is provided by the base extractors. So, for extractor $E_i$, Applicants have $D_i^* = D_i \cap TY_i$ where $D_i$ is the original extracted data and $TY_i$ is the type information corresponding to $D_i$.
2. The hypothesis space is expanded to include type. So $\Omega^* = \Omega \times TYPE$, where $\Omega$ is the original hypothesis space and $TYPE = \{TY^j : i=1, \ldots, t\}$.
3. The base extractors are independent⇒likelihood factors
4. Assume a diffuse prior probability distribution over $\Omega^*$ For this discussion, Applicants focus on a single base extractor E (e.g., Applicants drop the subscript notation) and let $H^* \in \Omega^*$ and $D^*$ be the hypothesis and extracted data, respectively. Then, $$P(H^*|D^*) \propto P(D^*|H^*)P(H^*) = P(D \cap TY|H \cap TYPE).$$

(A) Assume that $H^* = \emptyset$, then Applicants have the cases:

a. $D^* \neq \emptyset \Rightarrow D \neq \emptyset$, which implies $P(D \cap TY^j|H^* = \emptyset) = P(FA, TY = TY^j)$, where FA is a False Alarm error.

b. $D^* = \emptyset \Rightarrow D = \emptyset, TY = \emptyset$, which implies $$P(D^* = \emptyset | H^* = \emptyset) = 1 - P(FP) = 1 - \sum_j P(FP, TY = TY^j).$$

(B) Assume that $H^* \neq \emptyset$, then Applicants have the following cases:

First consider that $$P(H^* | D^*) \propto P(D^* | H^*)P(H^*) =$$

$$P(D \cap TY | H \cap TYPE) = \prod_{\tau_k \in T} P(D_k \cap TY_k | H_k \cap TYPE_k)$$

Consider the possible high-level errors: Miss, False Alarm (FA), Exact Match (EM), Null-Null (e.g., both data and hypothesis are empty)

a.

$$D_k^* = (D_k, TY_k) = \emptyset; H_k^* = (H_k, TYPE_k) = \emptyset \Rightarrow$$

$$P(D_k^* | H_k^*) == 1 - P(FA) = 1 - \sum_j P(FA, TY_k = TY^j)$$

b.

$$D_k^* = (D_k, TY_k) \neq \emptyset;$$

$$H_k^* = (H_k, TYPE_k) = \emptyset \Rightarrow$$

$$P(D_k^* | H_k^*) = P(D_k \cap TY_k = TY^j | H_k^*) = P(FA, TY_k = TY^j)$$

c.

$$D_k^* = (D_k, TY_k) = \emptyset;$$

$$H_k^* = (H_k, TYPE_k) \neq \emptyset \Rightarrow$$

$$P(D_k^* | H_k^*) = P(D_k^* = \emptyset | H_k \neq \emptyset) = P(\text{Miss}, TYPE_k = TYPE^j)$$

d.

$$D_k^* = (D_k, TY_k) \neq \emptyset;$$

$$H_k^* = (H_k, TYPE_k) \neq \emptyset; D_k = H_k \Rightarrow$$

$$P(D_k^* | H_k^*) = P(D_k = H_k; TY_k = TYPE_k) \equiv P(EM_1)$$

$$P(D_k^* | H_k^*) = P(D_k = H_k; TY_k \neq TYPE_k) \equiv P(EM_2)$$

So, at this point, Applicants can write out the entire likelihood expression, relative to Equation 8 in the Likelihood Algorithm section.

$$P(H^* \mid D^*) \propto P(D^* \mid H^*) = \prod_{\tau_k \in T} P(D_k^* \mid H_k^*),$$

$$P(D_k^* \mid H_k^*) =$$

$$\sum_{\tau^{m,n} \in T} \sum_{j=1}^{m} \sum_{l=1}^{m} P(s(e_1), \ldots, s(e_s) \mid \tau^{m,n}, TY^j, TYPE^l) P(\tau^{m,n}, TY^j, TYPE^l)$$

where $$D_k^* = (D_k, TY_k),$$

$$H_k^* = (H_k, TYPE_k)$$

Pattern Algorithm—Fundamentals

1 Introduction

The aggregation methodology described herein, called the pattern-based meta-extractor (PME), utilizes a pattern-based representation of named entity data to evaluate the joint performance characteristics of its base entity extractors. The resulting characterization is utilized to determine the most likely truth, given base extractor output.

2 Extractor Characterization

In the following discussion, Applicants assume that an entity can be expressed as a text string (e.g., name) that is associated with a location in the source text. To enable the characterization of base extractor performance, Applicants assume an annotated set of documents is available (distinct from those used for training) to serve as an "evaluation corpus" for the base extractors. Three distinct corpora may be used for: (1) training the base extractors; (2) evaluating their performance, and thereby training the meta-extractor; (3) testing the meta-extractor. The ground truth entity data, G, consists of the true (e.g., manually annotated) entities identified in the evaluation corpus. The meta-extractor aggregates the output of K>1 base entity extractors, where $D_k$ denotes the output of extractor k relative to a corpus. When the locations of a ground truth entity and an extracted entity intersect, Applicants say that the entities overlap. Applicants generally assume herein that ground truth entities do not overlap and that the entities extracted by extractor k do not overlap.

2.1 The Pattern Representation

Named entity extractors leverage different methodologies that can be coarsely partitioned into three fundamental types: rule-based, statistical and heuristic. Despite their algorithmic differences, their common objective is to correctly extract fragments from text that represent real-world entities, such as people, organizations, or locations. At a high level, the task may be regarded as a three-stage process in which an extractor (in some prescribed order) should detect a reference to an entity in a document, identify the offsets that delineate the name of a detected entity, and classify it as to its type. Applicants focus chiefly on the first two stages in the present disclosure.

Many of the most effective extractors are proprietary, and hence, direct analysis of the characteristic error processes of their underlying algorithms is often infeasible. Therefore, Applicants choose to treat each extractor as a "black box". However, when the base entity extractors are applied to a corpus for which the ground truth, G, is known, mistakes in their output, $D_k$, represent an observable transformation of the truth that is driven by their underlying error processes. In reference [14] (incorporated herein by reference in its entirety), the transformation was described in terms of a hierarchical error space relative to which the behaviors of each base extractor could be explicitly quantified. Despite the independence assumptions used in that study, the resulting meta-extractor achieved significant improvements over the performance of its base entity extractors. The PME methodology aims to further enhance these performance gains by relaxing those assumptions when sufficient data are available. Specifically, the PME utilizes an encoding of the combined base extractor output, D, that encodes the joint characteristics of the extractors' output and resultant errors.

To lay a foundation for the encoding, Applicants revisit a construct originally proposed in reference [14] called the meta-entity. The meta-extraction methodology assumed that when the base extractors are applied to a corpus for which ground truth is unknown, their combined entity output at a given location in the corpus encapsulates all available information regarding the corresponding underlying ground truth.

Hence, to facilitate discovery of the truth, mutually overlapping entities output by the K base extractors may be concatenated to form a meta-entity, which in turn can be used to generate a space of hypotheses over the ground truth. For example, in FIG. 5, the extracted data within each rectangle can be concatenated to form two distinct meta-entities consisting of the following fragments of text:

(i) "President Obama"

(ii) "Edward M. Liddy of the American International Group"

Figure 6:
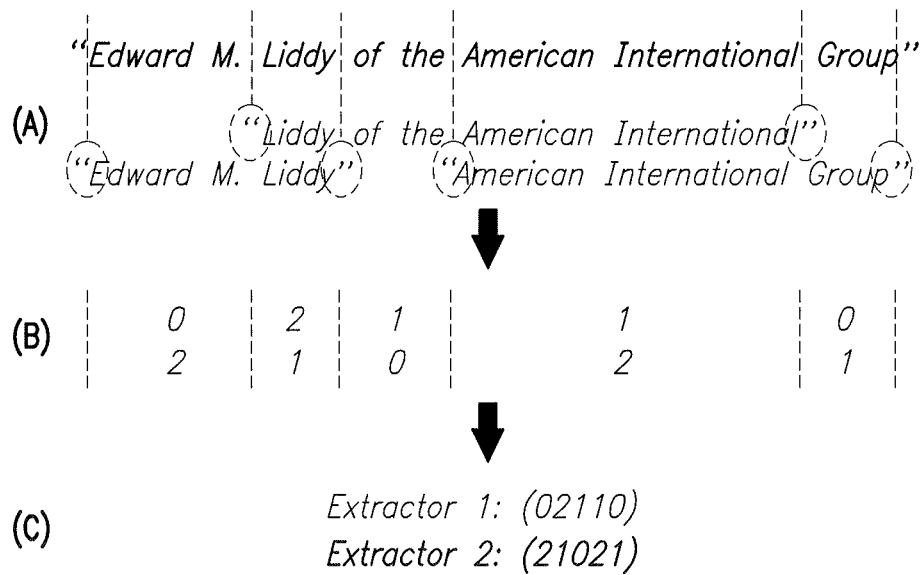
FIG. 6 shows an exemplary set of text data according to an embodiment of the information extraction system of the present disclosure. The set text data comprises a training corpus of source text and the extracted entities extracted by two separate entity extractors from the training corpus of source text. The pattern-based encoding associates the extracted entities to a meta-entity.

This meta-entity concept, as summarized above, forms the basis for the PME encoding. Let $D_{mk}$ denote the entity output of base extractor k used to form meta-entity m, and let $D_m = \{D_{m1}, \ldots, D_{mK}\}$. Note that $D_m$ consists of the K-way joint entity output of the K base extractors and possesses a distinctive structure that can be characterized by the boundaries of its individual entities. Specifically, the locations of its entity boundaries collectively define a K-way pattern, $d_m$, relative to m that can be encoded numerically via the following process (illustrated in FIG. 6):

Meta-entity m is partitioned into s segments terminating at the s+1 unique entity boundaries in $D_m$. For each extractor k, a string of length s (a simple pattern denoted $d_{mk}$) is constructed, in which "2" indicates the beginning of an entity, "1" represents the middle or end of an entity, and "0" indicates that the segment was not extracted by extractor k. A 1-way pattern is also referred to as a simple pattern. Applicants represent the K-way pattern corresponding to the segmented meta-entity m by $d_m = \{d_{m1}, \ldots, d_{mK}\}$.

Note that the segmentation strategy is motivated by the assumption that, if two words in the meta-entity remain "unbroken" by the base extractors (e.g., "American International" in FIG. 6), then they most likely remain unbroken in ground truth. That is, either they appear together within a single ground truth entity, or they do not appear in the ground truth at all. When the assumption holds, the likelihood that the truth will be discovered may increase, due to a simplification of the patterns involved. There is an implicit tradeoff, however, in that when the condition fails to hold, the truth can never be determined. Empirically, Applicants have found that such cases are fairly rare, and on balance, the performance of the PME appears to benefit from the assumption.

When the ground truth, $G_m$, associated with a meta-entity m is known and the above assumption is satisfied, an analogous simple pattern representation of ground truth can be derived from the meta-entity segmentation. For example, in FIG. 5, the ground truth is given by $G_m = \{\text{"Edward M. Liddy"}, \text{"American International Group"}\}$, and its associated pattern is given by $g_m = (21021)$. Note that, relative to a given segmented meta-entity m, any simple pattern having the same number of segments as m is invertible; that is, it can be readily decoded to reflect the underlying entity data that it represents.

2.2 The Pattern Dictionary

Figure 7:
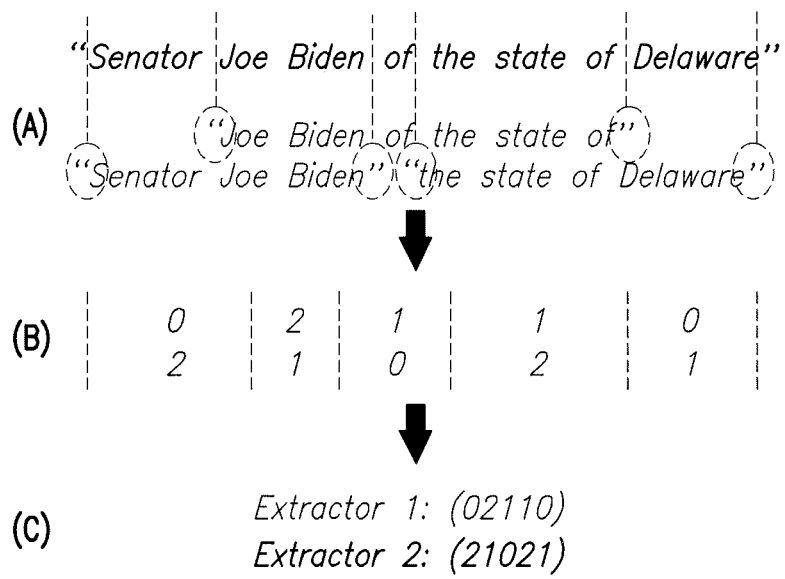
FIG. 7 shows another exemplary set of pattern-based association of extracted entities to meta-entities according to an embodiment of the information extraction system of the present disclosure.

The pattern-based encoding described in the previous section, by definition, relies solely on the joint structure of the entity data being encoded relative to a given segmented meta-entity. The feature is by design; many application domains operate better with language independent extraction tools. Consequently, a particular K-way pattern of extracted data may be repeatedly observed in a corpus regardless of the actual text involved in the associated meta-entities. For example, in FIG. 7, the extracted data are associated with a joint pattern identical to that shown in FIG. 6. Notice, however, that although the extracted data for these two examples give rise to the same encoding, their associated ground truths differ. In particular, the ground truth in FIG. 7 is given by $G_m=\{$"Joe Biden", "Delaware"$\}$, with the associated pattern $g_m=(02002)$. Hence, it is readily apparent that a particular pattern of extracted data, $d_m$, may be associated with many different ground truth patterns; in fact, the total number $a_s$ of unique ground truth hypotheses that may be encoded for a meta-entity of length s segments is given by $a_0=1$, $a_1=2$, $a_s=3a_{s-1}-a_{s-2}$. which leads to $a_2=5$, $a_3=13$, $a_4=34$, $a_5=89$, and so on. Clearly, only a subspace of the possible encodings will be observed in the training data for long patterns. Indeed, in practice, as pattern length increases, the relative size of the observed subspace shrinks rapidly. Some implications of the behavior will be discussed in later sections.

In an operational setting, the base entity extractors are applied to a corpus for which ground truth is unknown. With access to only the extracted entity output of its K extractors, the PME should determine the most likely ground truth (e.g., the set of true named entities, G). To address the efficiency desired of many real-world (e.g., streaming text) applications, Applicants assume herein that the source text cannot directly be accessed in the task.

The process involves (1) forming a collection of meta-entities from the extractor output, D, and (2) for each meta-entity m, determining the ground truth hypothesis (e.g., pattern) that is most plausible in a Bayesian sense among the $a_s$ possible hypotheses. Applicants will show that the optimal ground truth hypothesis $H_m^*$, given $D_m$, is that most frequently associated with the K-way pattern $d_m$ in the evaluation data set.

Evaluation of base extractor performance relative to an annotated data set consists of constructing a database, or pattern dictionary, from the evaluation data that stores counts of observed ground truth patterns for each K-way pattern derived from the extracted data. For example, a final entry in the pattern dictionary might resemble that shown in FIG. 8 for the 2-way pattern presented in FIGS. 6 and 7.

Consider a particular meta-entity m of size s having the K-way pattern $d_m$ and unknown ground truth. Let $\theta_1, \ldots, \theta_n (\Sigma\theta_j=1)$ denote the respective probabilities of the $n=a_s$ hypothesized ground truths, $H_{m1}, \ldots, H_{mn}$. Suppose there are a total of $N=N^{(K)} \geq 1$ occurrences in the pattern dictionary of the pattern $d_m$. Since the corresponding collection of N meta-entities may be regarded as a random sample from the population which generates the pattern $d_m$, the resulting pattern dictionary counts, e.g., the observed frequencies $f_1, \ldots, f_n(\Sigma f_j=N)$ of the set of possible ground truths, may be modeled as following a multinomial distribution. The frequency $f_j$ may be viewed as the number of "votes" for the ground truth hypothesis $H_{mj}$.

The conjugate prior for the multinomial distribution is the Dirichlet distribution, $D(\alpha_1, \ldots, \alpha_n)$, where the parameter $\alpha_j$ is essentially the number of a priori votes for hypothesis $H_{mj}$. For Applicants' application, Applicants have used a noninformative Dirichlet prior, e.g., $\alpha_1=L=\alpha_n=1/n$, which, in effect, splits a single a priori vote evenly among the candidate ground truths.

The posterior distribution of $\theta_1, \ldots, \theta_n$ then, given the observed frequencies $f_1, \ldots, f_n$, is $D(1/n+f_1, \ldots, 1/n+f_n)$. These frequencies have the effect of updating the number of votes for hypothesis $H_{mj}$ to $1/n+f_j$. Hence, the marginal posterior distribution of $\theta_j$ is the beta distribution with parameters $A_j=\alpha_j+f_j=1/n+f_j$ and $B_j=\Sigma\alpha_i+\Sigma f_i-(\alpha_j+f_j)=1+N-(1/n+f_j)$. It is the distribution that should be used to model the credibility of the hypothesized ground truth $H_{mj}$. In particular, the posterior mean for $\theta_j$ is given by $$\tilde{\theta}_j = E(\theta_j \mid f_1, \ldots, f_n)$$
$$= \frac{1/n + f_j}{1 + N}$$
$$= \frac{1}{1+N}\frac{1}{n} + \frac{N}{1+N}\frac{f_j}{N},$$

which is a weighted average of the prior mean, $1/n$, for $\theta_j$ and the sample proportion, $\hat{\theta}_j=f_j/N$, of observed patterns associated with $H_{mj}$. The weight $1/(1+N)$ represents the fraction of evidence coming from the prior.

The Bayesian optimum ground truth hypothesis $H_m^*$ is the $H_{mj}$ that maximizes the posterior mean $\tilde{\theta}_j$. Moreover, it is apparent from the formulation that it is equivalent to maximize $\hat{\theta}_j$. Hence, the optimal hypothesis is simply that most frequently associated with the K-way pattern $d_m$ in the evaluation data set, easily determined via the pattern dictionary.

In some applications of this technology, analysts may wish to consider some sub-optimal hypotheses having relatively high measures of plausibility. Candidate hypotheses $H_{mj}$ may be ranked equivalently by $\tilde{\theta}_j$ or $\hat{\theta}_j$, although as a point estimate of credibility, $\tilde{\theta}_j$ serves as the preferred figure of merit in the Bayesian paradigm. In addition, estimate uncertainty may be quantified by means of a Bayesian interval for $\theta_j$ based upon its beta posterior (easily constructed from the inverse cumulative beta distribution).

The Bayesian interval, by capturing a specified portion of the posterior distribution, provides a range of plausible values. For example, an 80% Bayesian interval can be defined to capture the central 80% of the distribution by extending from the $10^{th}$ to the $90^{th}$ percentile. In instances of sparseness of relevant pattern data (small N), in order to get reasonably short ranges, lower probability Bayesian intervals (e.g., 50%) may be used. A useful list for an analyst would display the posterior mean and associated Bayesian interval for the top hypotheses.

Since a K-way extracted pattern may be associated with many different ground truths, it is natural at present to question the use of structure alone in attempting to discover the truth. Indeed, the use of gazetteers, lexicons, stop-word lists and other commonly employed language-specific tools would undoubtedly enhance performance in some cases. However, since Applicants are motivated by a practical need for language-independent systems, Applicants' goal in the present disclosure includes the optimizing of performance in the absence of linguistic and semantic knowledge.

3 Unprecedented Patterns

When new extractor output $D_m$ is encountered in the field, it may happen that the associated K-way pattern, $d_m$, was not observed in the evaluation data set and, consequently, cannot be found in the pattern dictionary ($N^{(K)}=0$). Under conditions in which (1) the evaluation data set is of large enough size; (2) there are few base extractors under consideration; and/or (3) the base extractors exhibit similar behaviors with regard to extraction errors, the phenomenon is not frequently observed.

Unfortunately, in practice, these conditions often do not hold, and hence, Applicants present two enhancements of the PME that enable it to adapt to these challenging conditions.

Stepping Down

The K-way pattern described above is essentially a joint model over the K extractors and their corresponding behavior with respect to a given meta-entity. It is reasonable to assume that the pattern algorithm, if necessary, can utilize progressively weaker marginal models in an effort to capture some patterns that would not otherwise be observed. Applicants call the process "stepping down".

Stepping down involves reducing the number of extractors represented by the patterns in the dictionary in an effort to increase the likelihood that a given joint pattern will have been observed. Thus, in building the pattern dictionary, Applicants should additionally store counts of observed ground truth patterns for each k-way pattern derived from the extracted data, $1 \leq k \leq K-1$. During operation of the PME, when a K-way pattern cannot be found in the dictionary, frequencies of these smaller k-way patterns, k<K, are used to determine plausible ground truth. The particular value of k employed will be referred to as the stepping down level. Here, Applicants focus chiefly upon two approaches to implementing the stepping down procedure.

Simple k-Way Decision

A straightforward implementation of stepping down involves querying the dictionary for all possible k-way patterns, for successively smaller k, k<K, until one or more patterns is found. A K-way pattern induces $$T = \binom{K}{k}$$

k-way patterns $d_{mt}$, $t=1, \ldots, T$, according to the combination of extractors represented. As shown in FIG. 9, each k-way pattern and its associated ground truth patterns are reconfigured, if necessary, to comply with the segmentation induced by the s-segment K-way pattern $d_m$. Again, let $\theta_1, \ldots, \theta_n$, denote the respective probabilities of the $n=a_s$ possible ground truths, $H_{m1}, \ldots, H_{mn}$. Suppose there are a total of $N_t \geq 0$ occurrences in the pattern dictionary of the pattern $d_{mt}$, with $N=N^{(k)}=\Sigma N_t \geq 1$. Since we regard the corresponding collection of N meta-entities as a random sample from the population which generates patterns from $U_t d_{mt}$, the resulting pattern dictionary counts, i.e. the observed frequencies $f_1, \ldots, f_n$ ($Sf_j=N$) of the set of possible ground truths, may again be modeled as following a multinomial distribution. Here the frequencies are pooled over the T k-way pattern dictionaries. Bayesian inferences proceed as in the full K-way case, with the same expressions for $\hat{\theta}_j$ and $\tilde{\theta}_j$. Analogous Bayesian intervals may be constructed. It is interesting to note that the sample proportion $\hat{\theta}_j$ may be expressed as $$\hat{\theta}_j = \sum_{t:N_t>0} \frac{N_t}{N} \frac{f_{jt}}{N_t},$$

where $f_{jt}$ denotes the frequency of ground truth $H_{mj}$ occurring in the $t^{th}$ k-way dictionary, and $\Sigma_t f_{jt} = f_j$. Hence $\hat{\theta}_j$ is a weighted average of the k-way sample proportions $$\hat{r}_{jt} = \frac{f_{jt}}{N_t},$$

weighted by the relative sample sizes.

While the approach has been shown to be reasonably effective, it does not explore and compare probability estimates for all extractor combinations at all values of k. To this end, Applicants have developed an alternative approach that does so.

Lower Bound Maximization (LBM)

The essence of the LBM method consists of stepping down to the "best" combination of extractors, subject to a constraint on the reliability of the estimated probability of the top-ranking hypothesis associated with each combination. The LBM accounts for the fact that some combinations may exhibit better performance than others and leverages the fact given a pre-specified level of confidence.

The LBM method uses the lower Bayesian bound as a metric to compare hypotheses' probability estimates. Specifically, for each combination of base extractors i, the lower bound on the estimated probability of hypothesis $H_{mj}$, denoted by $x=l^{(i)}(H_{mj})$, is the solution to $$I_x(A_j^{(i)}, B_j^{(i)}) = \alpha,$$

where $I_x$ denotes the incomplete beta function, and the parameters of the corresponding beta distribution are computed in a fashion similar to that described in the preceding section.

The parameter $\alpha < 0.5$ is pre-specified such that $1-\alpha$ indicates the desired degree of confidence in a bound. Since higher bounds indicate greater plausibility, by comparing the bounds over all levels and hypotheses, Applicants effectively are able to rank the ground truth probabilities. The LBM optimum ground truth hypothesis, $H_m^*$ achieves the largest bound, e.g.

$$H_m^* = \underset{H_{mj}}{\operatorname{argmax}} \left( \max_i l^{(i)}(H_{mj}) \right)$$

Empirically, Applicants have found the LBM method to be fairly insensitive to the choice of $\alpha$.

In a similar fashion as stepping down, the LBM simultaneously addresses both the quality and uncertainty of estimates by assigning heavier weights to hypotheses associated with more observations $N^{(i)}$. Moreover, by introducing a confidence metric, it provides an avenue for directly comparing the estimates arising from the totality of possible extractor combinations.

Note that, although the simple k-way decision method described above aggregates the votes within each level $k \leq K$, the LBM methodology detailed here takes a different approach. Indeed, one could imagine implementing the LBM over all levels $k \leq K$, rather than over all combinations of base extractors. Applicants have, in fact, investigated the approach and have found in empirical tests that when data are plentiful, it performs equally well. However, when data are sparse, the former implementation appears to be highly susceptible to the influence of weak base extractors. Applicants conjecture that the latter approach, as described, has the advantage of disregarding weak base extractors, thereby improving performance under sparse data conditions.

3.2 A Sequential Meta-Entity Model

Although the marginal models utilized in Section 3.1 enhance the PME's ability to make decisions under sparse data conditions, there certainly remain cases in which even these techniques are unsuccessful.

Recall from Applicants' previous discussion that the K-way pattern encodes joint information among the errors (implicitly, via text structure) as well as among the base extractors. In many cases, the rarest of meta-entities consist of lengthy patterns, which represent a complex sequence of errors and disagreement among the extractors. Moreover, the underlying dependencies among extractors and among these implicit errors is unknown. Thus, it is reasonable to incrementally break down a K-way pattern across errors, rather than across extractors, so that the patterns arising from a single meta-entity are represented by progressively fewer segments. Applicants can address the approach via a sequential modeling technique that is often used in other language-based applications. Natural language applications lend themselves to such models; there is inherent meaning in the order of words/characters, and dependencies are often localized. For example, let one consider a 3-way pattern $d_m$, together with a hypothesis $H_{mj}$, as a sequence of columns as shown in Table 2.

TABLE 2

|           | $c_1$ | $c_2$ | $c_3$ | $c_4$ |
|-----------|-------|-------|-------|-------|
| $d_{m1}$  | 2     | 1     | 2     | 1     |
| $d_{m2}$  | 2     | 1     | 0     | 2     |
| $d_{m3}$  | 2     | 0     | 0     | 2     |
| $H_{mj}$  | 2     | 1     | 0     | 2     |

One can decompose the joint probability of the pattern $(d_m, H_{mj})$ in Table 2 as follows:

$$P(d_m, H_{mj}) = P(c_1, c_2, c_3, c_4)$$
$$= P(c_1) \prod_{t=2}^{4} P(c_t \mid c_{t-1}, \ldots, c_1),$$

where each column pattern is dependent upon those that precede it. Hence, when a complex pattern is encountered that cannot be handled by the previously described methods, Applicants make the assumption that each column pattern is dependent only upon the preceding n columns, with $n \leq s-1$ giving $$P(d_m, H_{mj}) = P(c_1) \prod_{t=2}^{s} P(c_t \mid c_{t-1}, \ldots, c_{t-n}).$$

Under the framework, Applicants select the hypothesis $H_m^*$ that satisfies $$H_m^* = \underset{H_{mj}}{\mathrm{argmax}} P(d_m, H_{mj}).$$

Note that taking n=1 in the sequential modeling approach yields a standard Markov model, which is commonly employed in natural language applications. Applicants have generally found the small window size to be fairly effective, requiring the least amount of data to obtain reliable probability estimates. Additionally, the approach can be applied to meta-entities segmented as described in Section 2, or meta-entities segmented by their individual tokens. Both approaches have performed well empirically.

5 Conclusions

According to the present disclosure, Applicants have presented a pattern-based aggregation methodology—the PME—that implicitly incorporates the joint behaviors of extractors and their error processes. Specifically, it has been shown to achieve statistically significant improvements in the summary metric, F Measure, over its base entity extractors in multiple experimental scenarios and on multiple data sets. Even under sparse data conditions, where marginal models become more critical, the PME remains effective.

Strategies for integrating across multiple marginal models under these conditions were also presented and their relative performance compared. One such strategy—the simple k-way decision—though generally effective and straightforward, makes the decision to step down based only upon the absence of a pattern in the pattern dictionary, without regard to uncertainty or accuracy across levels (e.g., different values of k). As a consequence, decisions may sometimes be made by few or highly variable data.

An alternative approach to the k-way decision, the LBM method, is able to account for the uncertainty across the various extractor combinations. Specifically, the method selects an optimum hypothesis according to a Bayesian lower bound metric appropriate and applicable across all of the combinations. As a result, it is competitive with the best-performing PAn algorithm in each of these empirical studies relative to F Measure.

Notably, both of the methods presented for stepping down operate best in when a parameter is specified for optimal performance. Specifically, the k-way decision operates with the selection of the minimum level k, while the LBM method operates when the parameter $\alpha$ is specified. However, Applicants' studies have generally shown that the LBM method is fairly insensitive to the choice of $\alpha$, and for the k-way decision, the choice of k=1 as the minimum level is frequently the most effective.

Although the PME is capable of adapting to sparse data conditions, maintaining high performance in the presence of such a challenge is not a simple issue to address. Future work will include sensitivity studies to evaluate the impact of data sparseness. However, data sparseness is only one of many challenging conditions that may be encountered in a real world operational setting.

In text applications, a wide variety of meta-entities are observed. These meta-entities can be distinguished by structural features derived from their underlying patterns of base extractor text. Other research Applicants have performed has demonstrated that the effectiveness of different aggregation algorithms can be linked directly to these characteristic features.

Bayesian Model Averaging (BMA)

1 Introduction

The explosion in the number of electronic documents (e.g., news articles, blogs, and emails) brought about by the advent of the internet and related technologies has made the automatic processing of text increasingly critical. In particular, systems that perform knowledge discovery based on information extracted from text are of growing interest to commercial, industrial, and governmental organizations, as they support analysis, decision making, and the development of strategies and policies. Since named entities (e.g., persons, places, and organizations) and their relationships often constitute a significant portion of the information content within source text, named entity extraction (NEE) has emerged as a key component of these systems.

The purpose of NEE is to automatically identify references to real-world named entities within structured or unstructured text documents, often as part of a more extensive information extraction and analysis effort. Success in the task depends upon accuracy in both the segmentation of text into entity and non-entity regions, as well as the classification of entity regions according to a prescribed (and often hierarchical)

collection of entity types. NEE has received considerable attention from the natural language processing (NLP) and, more specifically, information extraction (IE) communities, as evidenced by competitive evaluation tasks such as the Message Understanding Conference (MUC), the Conference on Computational Natural Language Learning (CoNLL), and the Automatic Content Extraction Evaluation (ACE). Numerous algorithms have been proposed for NEE and have been incorporated into knowledge systems in both research and operational settings. These algorithms frequently employ machine learning techniques and have been shown to achieve high performance, albeit in restricted domains (e.g., a specific language or specific sources for training and test data).

In an effort to improve upon these systems, some researchers have investigated techniques for combining multiple "base" extraction algorithms into an "aggregate" extraction algorithm. Throughout the present disclosure, Applicants will distinguish base (e.g., off-the-shelf) extractors and aggregates of these extractors in the fashion. These include methods such as voting as shown in references [1, 2, 6] (incorporated herein by reference in their entirety), stacking as shown in reference [5] (incorporated herein by reference in its entirety), or classification-based extractor combination as shown in reference [9] (incorporated herein by reference in its entirety). Results from these efforts have demonstrated that further gains can indeed be obtained by leveraging the respective strengths of different extractors.

In the present disclosure, Applicants introduce an aggregation technique based on the principle of Bayesian Model Averaging (BMA). Using the framework previously developed, Applicants' BMA-based approach estimates a posterior probability distribution over ground-truth hypotheses (e.g., possible segment label assignments) for a "meta-entity"—an entity region resulting from the union over individual extractor entity segmentations. The estimation is accomplished as follows: 1) a meta-entity is constructed from the joint output of the constituent base extractors; 2) a "hypothesis space" consisting of possible label assignments to the meta-entity segments is formed; 3) each extraction (e.g., base or aggregate) algorithm produces a distribution over the hypothesis space; and, finally 4) BMA is used to combine the hypothesis probability estimates produced by each of the algorithms based on their respective model posteriors. Note that in the case of a base extraction algorithm, the distribution over the hypothesis space frequently assigns a probability of 1 to a single hypothesis.

The methodology aims to improve on existing extraction techniques primarily in two respects: 1) reducing the variability in performance by accounting for uncertainty associated with individual model estimates, and 2) increasing robustness to the over-fitting frequently associated with training on a single corpus. Moreover, unlike many existing aggregation methods, this approach produces a true posterior distribution over possible "hypotheses", thereby enabling the confidence in the extracted data to be quantified.

2 Entity Extraction Algorithms

Although the substantial investments made by the NLP and IE communities in NEE have generated numerous approaches for solving this problem, these diverse methods can be roughly grouped into a few major categories. These categories include rule-based approaches as well as supervised, semi-supervised, and unsupervised learning methods. In the present disclosure, Applicants provide a brief overview of their respective characteristics.

2.1 Rule-based

In a rule-based NEE system, entities are identified according to a set of rules typically triggered by lexical, syntacical and grammatical cues. These rules are often hand-crafted using linguistic or corpus-based knowledge, and the triggering process is modeled as a finite-state transducer. A simple example of the approach is template matching via regular expressions. While such an approach can be reasonably effective and robust to shifting operational conditions, in cases where sufficient representative data exist, rule-based systems are typically outperformed by statistical learning approaches.

2.2 Supervised Learning

Supervised learning—the current state-of-the-art paradigm for NEE—utilizes features derived from text to infer decision rules that attempt to correctly identify and classify entities. Positive and negative examples of entities used to train a learning algorithm are obtained from a large collection of manually annotated documents. The particular learning algorithm employed varies based upon application-specific limitations and/or specifications, but the most widely accepted include support vector machines (SVMs), decision trees (DTs), hidden Markov models (HMMs), maximum entropy models (MEMs), and conditional random fields (CRFs).

The features used for supervised learning can be even more diverse than the algorithms themselves. Examples of commonly used features can be seen in Table 3.

TABLE 3

| Features | Examples |
| --- | --- |
| Case | Capitalized, all-uppercase, all-lowercase |
| Punctuation | End-period, internal-period, internal-apostrophe |
| Digit | Digit pattern, cardinal/ordinal/roman numeral, word w/digits |
| Character | Possessive mark, first-person pronoun, Greek letters |
| Morphology | Prefix, suffix, singular, stem, common ending |
| Part-of-speech | Proper name, verb, noun |
| Local syntax | Enumeration, apposition, position in sentence/paragraph/doc. |
| Meta Info. | URI, email header, XML sect., lists, tables, figures |
| Corpus Freq. | Word and phrase frequency, co-occurrences |

While supervised learning methodologies generally perform quite well in an ideal operating environment (e.g., having plentiful representative data for training), they tend to be highly vulnerable to evolving or sparse data conditions. Semi-supervised (or "weakly supervised") and unsupervised methods attempt to address these issues by circumventing the need for extensive manual annotation.

2.3 Semi-Supervised and Unsupervised Learning

Specifically, semi-supervised learning is generally an iterative procedure in which a small number of labeled "seed" examples are used to initiate the learning process. The algorithm subsequently generates new training examples by applying the learning from the previous step to unannotated data. The process is repeated until no new examples are generated. One typical approach involves identifying contextual clues from the seed examples and attempting to find new examples that appear in similar contexts. New context information and additional examples are then obtained in an iterative fashion.

Unsupervised learning algorithms, on the other hand, operates with no annotated data for training Generally they rely on clustering methods to group named entities based upon similarity of context. Alternative approaches rely on external lexical resources, lexical patterns, and on statistics computed over a large unannotated corpus.

3 Combination Techniques

With the variety of extraction algorithms available, a natural extension to traditional NEE approaches is to combine these algorithms—and, consequently, their underlying models—in an attempt to achieve improved performance. The expectation is that these algorithms will collectively use rich and diverse feature representations and will possess complementary characteristics that can be leveraged to enhance positive attributes—such as low false alarm or miss rates—while mitigating their individual weaknesses. The most straightforward and intuitive of such approaches utilizes a voting mechanism. Voting techniques examine the outputs of the various models and select the classification with a weight exceeding some threshold. Variations in the voting mechanism employed typically differ in regard to their weighting scheme for individual models. Example voting methods include majority voting as shown in reference [1] (incorporated herein by reference in its entirety), at-least-N "minority" voting shown in reference [6] (incorporated herein by reference in its entirety), and weighted voting via SVMs shown in reference [2] (incorporated herein by reference in its entirety).

A more sophisticated combination scheme discussed in reference [8] (incorporated herein by reference in its entirety) interpolates a word-conditional class probability distribution across the base extractors $BE^n=BE_1, BE_2, \ldots, BE_n$, where the class, C, corresponds to a word's position relative to a named entity (start/within/end/outside). The distribution, $P(C|w, BE_1^n)$, is interpolated using weights estimated from training data.

One limitation common to many of these methods is their failure to account for the local context of a word or entity of interest. A conditional random field model, as proposed by reference [9] (incorporated herein by reference in its entirety), addresses the shortcoming and was shown to yield enhanced performance.

An alternative to the parallel combination techniques described above is the serial process of stacking as shown in reference [5] (incorporated herein by reference in its entirety). In stacking, two or more classifiers are trained in sequence such that each successive classifier incorporates the results of those preceding it. Of course, the above combination approaches can themselves be combined to produce a new methodology, as demonstrated in reference [4] (incorporated herein by reference in its entirety).

Applicants proposed a new parallel combination technique based on a "pattern" representation of base extractor output. Specifically, the pattern-based meta-extractor (PME) utilizes a pattern that encodes the joint characteristics of the combined extractor output, D, and (implicitly) their associated errors. The union of overlapping base extractor output regions—the "meta-entity", as previously defined—provides the textual extent over which a pattern is encoded. Example meta-entities are shown in FIG. 5.

By observing the frequency of these patterns jointly with similar encodings of ground-truth labels, for an annotated "evaluation" set, Applicants can compute an estimate of the probability of a hypothesized ground-truth, h, given an observed joint extractor output d. To reduce notational complexity, h will generally refer to truth, whether that truth is known, unknown, or hypothesized. The nature of h may be inferred from associated context. Applicants then select the hypothesis h' according to $$h' = \mathrm{argmax}_{h \in \Omega} p(h|d, \vec{h}, \vec{d}) \quad (1)$$

where $\Omega$ is the set of possible hypotheses for a given meta-entity and $p(h|d, \vec{h}, \vec{d})$ is the estimated probability of hypothesis h given an observed output d and the evaluation set ($\vec{h}$, $\vec{d}$).

One notable property of the PME methodology is that it models the joint characteristics of base extractors and the errors they are likely to produce without knowledge of the underlying algorithms or their individual error processes. As such, each base extractor can be regarded as a "black box" whose output alone is necessary for aggregation. The distinctive characteristic of the PME enables it to address practical issues such as language independence and proprietary restrictions of base extractors. Another notable property is that the method yields a probability estimate for each possible ground-truth hypothesis, facilitating the use of BMA, which is discussed in the next section.

4 Bayesian Model Averaging

Bayesian Model Averaging (BMA) is a statistical technique designed to account for the uncertainty inherent in the model selection process. BMA is sharply contrasted with the typical statistical approach in which a single model is selected from a class of models, and fitting proceeds as if the model had generated the data at hand. In NEE, it is common for a single extraction algorithm to be selected a priori and its parameters estimated, or for a collection of algorithms to be combined according to a single aggregation rule. Consequently, NEE represents an appropriate problem domain for the practical application of the model averaging technique.

BMA is used to estimate a posterior probability distribution, $\pi$, over a value of interest, $\Delta$, given the available data, D, by integrating over a class of models, M, and the model parameters. The posterior probability distribution can be expressed as $$\pi(\Delta|D) = \sum_{M \in \mathcal{M}} P(M|D)\pi(\Delta|M, D)$$

where P(M|D) is the model posterior and $\pi(\Delta|M,D)$ is the posterior distribution of the value of interest produced by the model M. Thus, BMA provides a principled mechanism for combining the posterior distributions produced by the individual models by weighting each model in proportion to its posterior probability. Using Bayes' rule, the model posterior can be computed as $$P(M|D) = \frac{P(M)P(D|M)}{\sum_{M \in \mathcal{M}} P(M)P(D|M)}. \quad (2)$$

Furthermore, the posterior expectation and variance can be expressed as a function of the individual model estimates of the respective quantities. Specifically, $$E(\Delta|D) = \sum_{M \in \mathcal{M}} P(M|D)E(\Delta|M, D)$$

and $$\mathrm{var}(\Delta|D) = \sum_{M \in \mathcal{M}} P(M|D)(\mathrm{var}(\Delta|M, D) + E(\Delta|M, D)^2) - E(\Delta|D)^2.$$

5 Models, Estimation, and Implementation

As previously mentioned, the general NEE task consists of both the segmentation of text into entity and non-entity regions and the classification of entity regions according to entity type. Within the meta-entity framework, however, the task reduces to a modified classification problem. More formally, the classification consists of identifying the correct hypothesis h' from the set of possible hypotheses $h \in \Omega$, given the observed output, d, and the evaluation data ($\vec{h}$, $\vec{d}$). In Applicants' case, Applicants use a maximum a posteriori (MAP) decision rule for classification:

$$h' = \mathrm{argmax}_{h \in \Omega} p(h|d, \vec{h}, \vec{d}).$$

This hypothesis probability estimate is model-dependent. To address the uncertainty inherent in model selection, Applicants can reformulate the estimate within the context of model averaging as $$p(h | d, \vec{h}, \vec{d}) = \sum_{M \in \mathcal{M}} P(M | \vec{h}, \vec{d}) p(h | d, \vec{h}, \vec{d}, M). \quad (3)$$

where the model posterior does not depend upon the newly observed output—e.g., $P(M|\vec{h}, \vec{d}) = P(M|d, \vec{h}, \vec{d})$—and the posterior distribution of h produced by M is weighted based on the evaluation data.

Aggregating the output of base and/or aggregate extraction algorithms via BMA operates in a way that Applicants specify a probabilistic model to describe the relationship between extractor output, d, and the underlying ground truth, h. Applicants begin by assuming that ground truth is generated by the extractor output (by a fixed conditional distribution) where meta-entities are exchangeable within the corpus. The assumption allows a "bag-of-meta-entities" approach similar to the bag-of-words approach of reference [15] (incorporated herein by reference in its entirety) to be employed, with the distinction that, in the current case, a bag is formed with respect to the corpus rather than an individual document.

First, consider the ground truth $h_i$ and extractor output $d_i$ associated with the i-th of n meta-entities extracted, and denote the evaluation set as $\vec{h} = (h_1, \ldots, h_n)$ and $\vec{d} = (d_1, \ldots, d_n)$. A generative process producing $h_i$ under model M is given by $$l_i | M \sim \mathrm{Poisson}(\gamma_M)$$

$$d_i | M, l_i \sim \mathrm{Multinomial}(\beta_{M l_i})$$

$$h_i | M, d_i \sim \mathrm{Multinomial}(\vec{\theta}_{M d_i})$$

where $l_i$ is the length of the i-th meta-entity. That is, a new pair $h_i$, $d_i$ can be generated by (1) drawing the meta-entity length $l_i$ from a Poisson distribution, (2) drawing the joint extractor data $d_i$ from a multinomial distribution over all joint outputs of a given length, and finally (3) drawing the ground truth $h_i$ from a multinomial conditioned upon $d_i$. The dimension of the multinomial distribution over ground truth—and, consequently, the parameter vector $\vec{\theta}$—depends upon $d_i$; specifically, the length $l_i$ of the meta-entity is determined by $d_i$. The number of possible representations of the truth under the well-known BIO (begin/inside/outside) model is equal to all sequences of B-I-O where an O can not immediately precede an I. The rate of growth can therefore be described by the recursive formula $a_l = 3a_{l-1} - a_{l-2}$, based upon reference [16], incorporated herein by reference in its entirety, where l is the length of the meta-entity and $(a_0, a_1) = (1, 2)$.

The overall likelihood for the data ($\vec{h}, \vec{d}$) under model M can be computed according to $$p(\vec{h}, \vec{d} | \vec{\theta}, \vec{\beta}, \gamma) = \prod_{i=1}^{n} p(h_i | \vec{\theta}_{M d_i}) p(d_i | \beta_{M l_i}) p(l_i | \gamma_M) \quad (4)$$

where $p(d_i | M, l_i)$ and $p(l_i | M)$ can either be modeled or taken as exogenous, in which case they do not contribute to the likelihood. Ultimately, a total of $\Sigma_{M \in \mathcal{M}} |D_M|$ multinomial models for h|d must be estimated, where $D_M$ is the collection of multinomials whose size grows at a rate of $a_l^b$, with b representing the number of constituent extractors whose output is modeled. In practice, meta-entities of length greater than 5 are rarely observed, limiting the actual number of models to be estimated.

Traditionally, there are two primary challenges encountered when implementing model averaging: (1) summing over the (possibly large) class of models, M; and (2) computing the model likelihood, P(D|M), which involves integrating over all possible model parameter values. In the case of extraction algorithms, however, Applicants only address the latter, as the classes of models considered are usually small and efficient enough to be readily enumerated and evaluated.

The model likelihood is determined by integrating over all possible parameter values and is given by $$P(\vec{h}, \vec{d} | M) = \iiint p(\vec{h}, \vec{d} | M, \vec{\theta}, \vec{\beta} \gamma) P(\vec{\theta}, \vec{\beta} \gamma | M) d\vec{\theta} d\vec{\beta} d\gamma. \quad (5)$$

Rather than attempt to evaluate the integral directly, Applicants approximate it by evaluating the likelihood given a point estimate in place of the integral—not an uncommon practice as shown in reference [17] (incorporated herein by reference in its entirety). For example, when $h_i$ is taken as the sole random component, then $P(\vec{h}, \vec{d} | M) \approx P(\vec{h}, \vec{d} | M, \hat{\theta})$. One complication of the approach is the potentially varying amount of evaluation data available for estimating the different multinomial models. A simple model likelihood (or log-likelihood) calculation would have the undesirable effect of penalizing models with more evaluation data. Additionally, the exponential dependence of the likelihood on the proportion of correctly classified samples potentially places almost all of the probability mass on a single model. To address the issue, Applicants choose, instead, to compute the mean log-likelihood of the model.

The practical issues of BMA for NEE are not limited to those mentioned above. Additional considerations include parameter estimation, the form of the output of the extraction algorithms, the class of models, and the model priors. These are discussed below.

5.1 Parameter Estimation

Recall from Section 5 that, under the meta-entity framework, a model M consists of a set of multinomial models $D_M$, each of which has a set of parameters $\vec{\theta}$ that must be estimated. A reasonable approach is to perform maximum likelihood parameter estimation, but difficulties arise when faced with sparse evaluation data. To address this, we employ a Bayesian estimate using a non-informative Dirichlet prior $D(\alpha, \ldots, \alpha)$. Using the posterior expectation as the parameter estimate yields $$\hat{\theta}_{Mdh} = \frac{n_{Mdh} + \alpha}{n_{Md} + a_l \alpha}$$

where $n_{Mdh}$ denotes the number of training examples under model M, extractor output d, and ground-truth hypothesis h, and $n_{Md} = \Sigma_{h \in \Omega} n_{Mdh}$. The estimates of $\vec{\beta}$ are similarly obtained.

5.2 Hard and Soft Classification

Frequently, the task of classification is separated into two paradigms: (1) hard classification, in which each observation is assigned to a single class; and (2) soft classification, in which an observation is assigned a probability distribution over all classes. In reference to equations 2 and 3, there are only two places where these approaches differ relative to the implementation of BMA: (1) the computation of the model posteriors via model likelihood; and (2) the posterior predictive distribution $p(h|d, \vec{h}, \vec{d}, M)$. The latter difference is easily reconciled, as under the hard classification paradigm, $p(h=h'|d, \vec{h}, \vec{d}, M)=1$ for the assigned class h', and 0 for all others. If desired, a soft classification is transformed similarly according to $$p(h \mid d, \vec{h}, \vec{d}, M) = \begin{cases} 1 & \text{if } h = h' \\ 0 & o.w. \end{cases}$$

where $h'=\text{argmax}_{h' \in \Omega} p(h|d, \vec{h}, \vec{d}, M)$.

The computation of the model likelihood $P(\vec{h}|\vec{d}, M, \vec{\theta})$ is almost as easily handled. The likelihood associated with hard classification is computed by taking a product of the probability of correct classification over all training observations. That is, $$P(\vec{h} \mid \vec{d}, M, \vec{\theta}) = \prod_{h \in \Omega} \hat{\theta}_{Mdh}^{n_{Mdh}} (1 - \hat{\theta}_{Mdh})^{n_{Md} - n_{Mdh}}$$

where $\theta_{Mdh}=1-\epsilon$ and $\epsilon$ is an error rate associated with the algorithm as shown in reference [18] (incorporated herein by reference in its entirety). The error rate may be estimated using additional features not included in the predictive framework in a manner similar to that described in subsection 5.3. The computation of the likelihood under soft classification is simply the product of the probabilities of the observed classes, e.g., $$P(\vec{h} \mid \vec{d}, M, \vec{\theta}) = \prod_{h \in \Omega} \hat{\theta}_{Mdh}^{n_{Mdh}}.$$

5.3 Model Priors

Two types of priors figure into the BMA framework: (1) $p(\vec{\theta}|M)$, a prior on the parameters given the model; and (2) $p(M)$, a prior distribution over the possible models. Although non-informative priors are typically desirable for the parameters of a given model, these distributions have been shown to be somewhat less effective when specified over a class of models as shown in reference [19] (incorporated herein by reference in its entirety). As noted in Section 5.1, Applicants use a Dirichlet prior for the multinomial distribution parameters. With regard to the prior distribution over models, Applicants consider several alternatives, discussed below.

1. Uniform A uniform prior, $P(M)=1/|M|$, over the class of models results in a probability distribution which tends to place more weight on simple models. The results from the composition of the model classes and the fact that the joint output of more complex models has a higher dimensionality and, consequently, decreases their likelihood.

2. Complexity-based A prior that places proportionally more weight on the more complicated models can be used to produce a model posterior that more evenly distributes probability over the class of models. In Applicants' case, if the joint output space of k extractors grows at a rate of $a^k$, then Applicants may consider $p \propto a^k$.

3. Exact Match Rate A $n$ empirical or subjective prior based on the overall performance of a given model can also be used. One reasonable option is $P(M) \propto E_M$ where $E_M$ is the exact match rate, e.g., the frequency with which the extractor output is identical to the ground truth, associated with model M. A possible extension is to model the rate as a function of meta-entity attributes, where the prior depends upon features specific to a meta-entity that are not yet directly accounted for in the probabilistic model, $P(M|x) \propto E_M(x)$. For example, define x as the number of words in the meta-entity. If model M performs poorly when x<3 and very well when x≥3, then different prior probabilities may be appropriate.

5.4 Model Classes

The class of models M may be formed in several ways, although some of the more compelling focus on addressing sparse data conditions. Typically, more complicated aggregation models that account for the joint behavior of their constituent extractors operates in a way that utilizes the estimation of many parameters, leading to less reliable estimates than those obtained under simpler frameworks.

1. Off-the-shelf algorithms The output of any collection of existing entity-extraction algorithms can be easily handled within the model averaging framework. First, a meta-entity is constructed relative to the joint output of the collection. The output of each algorithm is then recorded relative to the joint, and the error probabilities are calculated. Finally, a prediction is made on the newly extracted data by evaluating the model posteriors relative to the joint output.

2. Pattern and likelihood algorithms The pattern and likelihood aggregation algorithms Applicants developed both use the meta-entity construct and are thus naturally suited to determine the class of models. The performance of these algorithms can vary substantially based upon characteristics of the joint extraction. For example, under the pattern algorithm evaluation examples tend to be relatively sparse for long joint outputs, resulting in parameter estimates with higher variability. Within the pattern algorithm framework, these challenges can be addressed by considering subsets of extractors, or by making certain independence assumptions, as shown in Table 4. In such cases, a model posterior probability can be computed which reflects the relative confidence in a specific subset or independence assumption, respectively.

TABLE 4

| |
| --- |
| $P(H|D_1, D_2, D_3)$ |
| $P(H|D_1, D_2) P(H|D_3)$ |
| $P(H|D_1, D_3) P(H|D_2)$ |
| $P(H|D_2, D_3) P(H|D_1)$ |
| $P(H|D_1) P(H|D_2) P(H|D_3)$ |

3. Unions In general, any combination of model classes can be combined using BMA, provided that the constituent outputs are represented under the meta-entity framework, thereby transforming the problem into one of classification.

7 Conclusions

Utilizing Bayesian Model Averaging, Applicants have developed an approach to the aggregation of entity extractors which is capable of: (i) reducing the variability in performance by accounting for uncertainty associated with individual model estimates, and (ii) increasing robustness to the over-fitting frequently associated with training on a homogeneous corpus. In practice, developing priors based on the complexity of the constituent models produced the best results in terms of F-measure. Additionally, Applicants observed that while the selection of model class and an associated prior are separate components of the process, they should be considered simultaneously to achieve optimal performance. Although Applicants have focused on a small set of open-source base extractors and two aggregation algorithms, the approach could be applied to a wide variety extractors, as they are all treated as "black boxes".

Combining Methodologies

1 Introduction

With respect to the pattern algorithm, the authors acknowledged that the pattern dictionary constructed during the "training" phase of the pattern-based meta-extractor would not contain every pattern that might be encountered in a testing or operational phase. The basis for this lies in the fact that the pattern described by the authors, in essence, encodes all joint information relating to the type, number, and location of every error generated by every base extractor in a local region of text (called the meta-entity, first introduced in reference [14]). It is certainly true in general that it would be impossible for a finite set of training documents to contain all possible patterns that may be encountered. However, this becomes far more problematic when (1) there are a large number of extractors, and hence, many more possible patterns that may be observed; and (2) training data are sparse, leading to a much smaller pattern dictionary. Additionally, recent extensions to the algorithms that incorporate ontological type further exacerbate the issue.

By its very nature, the pattern algorithm is expert at determining the correct entity form for frequently observed, simple patterns. For example, consider the case of two extractors where the meta-entities are given by (i) "Two chief executives", (ii) "furor over Wall Street bonuses", (iii) "President Obama", and (iv) "Edward M. Liddy of the American International Group". According to pattern-algorithm segmentation guidelines, meta-entity (i) consists of 1 segment, and the patterns for Extractors 1 and 2 would be (1,1) and (0,0) respectively, producing the combined pattern P={(1,1), (0,0) }. Observe that every time Extractor 1 extracted text when Extractor 2 extracted none, the result would be pattern P. Moreover, it is entirely reasonable to expect that such a pattern might be very frequently observed. Suppose P were observed a total of 1,000 times during training, and in 700 cases, (1,1) was observed to be the truth. Then if P were encountered in the field where the truth is unknown, Applicants could say that the pattern (1,1) is true with probability 0.7. That is, Applicants' probability estimate is based upon the relative frequency of patterns among the 1000 training observations.

What happens, however, if (1,1) is observed to be the truth 501 times, as opposed to (0,0), which is observed 499 times? Is (1,1) really more likely than (0,0)? What happens when a pattern is only observed 5 times during training? Or only once? Although the authors address the issue of patterns that are not observed during training, there is a larger concern that for more complicated patterns, the algorithm makes decisions under highly uncertain conditions, based upon either too few observations, or frequencies that are too close to call. Moreover, the very nature of the cases that are passed on to the majority vote algorithm by the authors belies the use of a simple solution. Many of these cases are rarely observed in training data, if at all, because they are complex, with significant disagreement among extractors. It follows, then, that a majority vote is probably not the ideal algorithm to handle these cases.

As mentioned above, these issues will be present to some degree in most operational cases and are likely to be exacerbated as training data become sparser. The pattern algorithm, under these conditions, will become increasingly more dependent upon other algorithms that are meant to handle these novel patterns, such as the majority vote algorithm used by the authors—a "second stage", as it were. Hence, Applicants' primary focus is to address hybrids of the pattern algorithm that incorporate various methods to address these challenges.

2 Staging

The fundamental idea underlying the staging methods is the assumption that the pattern algorithm is relatively effective in the decisions that it makes, and that Applicants merely need to provide a "second stage" to handle the patterns that are not found by the pattern algorithm. The algorithms that may fill the role are numerous, so Applicants have described just a few of these in more detail in the following subsections. First, Applicants describe an extension to the pattern algorithm that can be utilized in conjunction with staging to improve its effectiveness.

2.2 Staging: A Majority Algorithm

The second stage may involve using a majority vote algorithm as discussed earlier in the present disclosure. When ties are encountered (if the number of base extractors is even), they may be broken randomly, unless the costs of Type I and II error are known a priori to be unequal. Under such circumstances, the tie could be broken to favor a particular error. The approach Applicants utilized was a simple B-I-O model, which assigns a label to each word according to the role it plays in an entity. Although there is nothing inherently wrong with the approach, it presupposes that all base extractors are equally adept, which is a faulty assumption given that the cases handled by the second stage are likely to be highly complex. Voting-based methods that are utilized as the second stage of the pattern algorithm may place greater weight on those extractors that are known to excel. Possible strategies to accomplish this include, but are not limited to (1) utilizing prior performance estimates, perhaps generated in a fashion akin to that described in reference [14], or simpler measures, to enact weighted voting; or (2) breaking ties by accepting the vote of the superior base extractor, again evaluated a priori. The use of majority voting methods, in general, is likely to be inferior to other staging methods that take a more sophisticated approach.

2.3 Staging: The Likelihood Algorithm

The Likelihood Algorithm (LA) that was presented above represented a significant departure from previous combination techniques, in that it harnessed the unique characteristics of its base extractors via the estimation of conditional probability distributions over a space of extraction errors defined relative to the entities themselves. The resulting performance profiles are used to determine the most likely truth, in a probabilistic sense, given a meta-entity. The LA is based upon a flexible framework that utilizes user-defined transformation and error spaces and does not assume a particular method for likelihood estimation. In addition, though it is not inherently limited by independence assumptions (e.g., the LA is fundamentally based upon a joint probability model), the method was shown to perform exceptionally well, even when simplifying assumptions were made regarding the independence of extractors and extraction errors, and when simple relative frequency estimates were used. In this regard, the algorithm can make use of the strengths and weaknesses of the individual base extractors with less reliance upon training data than is that which is typically used by the pattern algorithm. As such, it presents a welcome choice for the second stage of the pattern algorithm, in that it is well-positioned to handle complex aggregation tasks, even under conditions where training data are sparse.

In the seminal paper on the topic, reference [14] (incorporated herein by reference in its entirety), though the authors acknowledged different approaches for computing probability estimates, they did not fully explore the implications of these choices. It is known that, in applications of this type, there is an inherent tradeoff between Type I and II errors, e.g., miss and false alarm rates. Note that each hypothesis space generated by the Likelihood algorithm contains a single "null" hypothesis (e.g., empty) and some number (possibly large) of non-null hypotheses. The tradeoff between misses and false alarms produced by the meta-extractor, in the framework of the present disclosure, is a function of the frequency with which the null hypothesis is chosen (or not chosen) incorrectly. Hence, the tradeoff is a direct consequence of how the likelihood of the null hypothesis is computed relative to those of the non-null hypotheses. The likelihood of the null hypothesis, in particular, depends heavily upon the probability estimates of the base extractors' false alarm rates.

Whether there is a "correct" or "ideal" estimate for the probability of false alarms may be beside the point; indeed, the authors do not directly address the issue. However, it is clear that a mechanism exists in the framework—a knob—that can enable the tradeoff between Type I and II errors produced by the meta-extractor. It is this flexibility that allows one to effectively address cost-sensitive applications of the information extraction technology of the present disclosure. Applicants have made some gains in the area, where Applicants have been able to influence the tradeoff via different base extractor false alarm estimates. For example, one can decrease the estimate by taking a relative frequency within the context of the entire corpus (rather than relative to transformations alone). In doing so, one can effectively reduce the miss rate of the meta-extractor.

An additional note on the Likelihood Algorithm: in some cases, the probability estimate for a given error will be highly variable due to its reliance on a small amount of data. This is especially true for some of the conditional probability estimates that are computed. These estimates can be augmented with a Bayesian prior (diffuse or otherwise) that can be easily computed either a priori or during runtime. These estimates can be used in the LA either standalone, or as a part of a hybrid algorithm. Regarding the error space, it need not be static. In cases where data may be sparse for certain errors, the error space can be defined hierarchically and leveraged in a dynamic fashion to adapt to varying amounts of data.

2.4 Staging: "Pushing"

At this point it is appropriate to introduce the concept of "pushing". A staged algorithm accepts the decision of the pattern algorithm, if a decision can be made, and "pushes" cases in which a decision cannot be made to the second stage, e.g., the LA. In such cases, the second stage should be able to make a decision. However, recall that in Section I, Applicants discussed situations in which a pattern can be found in the pattern dictionary, but a decision is made under conditions of high uncertainty. In these cases, it may be advisable to take a different, or more informed, approach.

2.5 Push Rules

Applicants have instituted a collection of "push rules", which can be expanded as needed, that determine which cases are passed on to the second stage. For example, Applicants can set a rule to push any case in which a pattern was observed only once, or less than n times, where n is specified by the user. Applicants can also set a rule to push any cases that are virtual ties. Applicants have observed that cases pushed to the LA, for example, are decided with as much as four times greater accuracy than that achieved by the pattern algorithm alone on those same cases.

2.6 Pushing a Prior

The push rules discussed in the previous section are helpful and improve the performance of the algorithm. However, in cases where a pattern is found in the pattern dictionary but pushed to the second stage, it is not necessarily desirable to discard the information in the pattern dictionary.

Recall that the pattern dictionary contains a posterior probability distribution over the space of hypothesized ground truth patterns (via relative frequency estimates). Even if a pattern was observed only once, that is information that may be helpful to the second stage. To this end, Applicants also have the option to push a prior probability, along with the pattern in question, that is based upon the posterior distribution in the pattern dictionary. In general, Applicants have allowed the prior probability to be tunable—it can be weak or strong, smoothed or not smoothed, depending on the users' preference. Of course, a strong prior tends to lend more influence to the pattern algorithm in making the final decision. Hence, different push rules sometimes demand a different type of prior, which may be determined by the number or nature of pattern observations. The level of flexibility provides a user with a great many tools to influence the performance of the meta-extractor.

It should be noted, here, that the pattern algorithm produces posterior distributions over ground truth that are based upon "segmented" meta-entities, whose segments may include multiple words. The Likelihood Algorithm is designed to construct a hypothesis space based upon the selection of individual words in the meta-entity. Hence, the hypotheses generated by one algorithm might not "match up" to those of the other, complicating the process of combining the pattern-based prior with the LA's likelihood when the two are staged together. To this end, Applicants have designed a new segmentation process that is token-based (e.g., word-based) so that it will generate hypotheses that precisely correspond with those constructed by the LA.

3 Other Hybrids 3.1 Pattern as a Prior

Beyond the general staging paradigm that Applicants have described above, there are other hybrid algorithms that Applicants have developed that have shown promise. Two of those are described here. One involves using the pattern algorithm to form a prior probability over the space of hypothesized ground truth (in the spirit of Bayesian inference), and then using the prior in conjunction with another algorithm, such as the LA. Note that this is similar to the staged algorithm in which Applicants push a prior, but in this case, everything is pushed to the second stage, and a prior is generated for each case. As discussed previously, the prior may be weak or strong, depending upon the case in question and the preferences of the user.

3.2 Using Dirichlet Prior for LA

The pattern algorithm and the likelihood algorithm have both proven effective in aggregating the outputs of different extractors. Experience has shown that using the output of the pattern algorithm as a prior to push along to the likelihood algorithm can be helpful. The route, however, has not been explored in detail, and it remains to be seen how much of an improvement can be gained by using a prior. Here Applicants will provide a couple of ideas on how a prior could be implemented. In particular Applicants will attempt to approximate a Dirichlet prior to the likelihood algorithm. The pattern algorithm lends itself well to a Dirichlet prior, as it has counts that allow for built in confidence estimates. The likelihood algorithm, however, does not lend itself quite so easily to these type of estimates. Applicants shall endeavor here to provide some options for estimating confidences.

It is assumed that the reader knows the basics of the pattern and likelihood algorithm. For ease of communication Applicants will introduce the following terminology. The pattern dictionary keeps track of the counts of ground truth patterns relative to the combined patterns of the different extractors. The combined patterns of the different extractors will be referred to as a dictionary entry. For each dictionary entry there is a list of ground truth entries with corresponding counts. These counts and frequencies will be called the definition corresponding to the dictionary entry.

One option is to simply put probabilities of the pattern algorithm and likelihood algorithm on equal footing. In the processing stage, for any given meta-entity Applicants will first calculate a dictionary entry. Applicants will then look up the entry in the pattern dictionary to find a definition. Applicants will then sum over the ground truth entries in the definition to obtain a count sum, S. Once Applicants have a count sum, Applicants will run the likelihood algorithm as normal, forming the hypothesis space, $\Omega$, and a corresponding probability density function, $f$. For each hypothesis, $h \in \Omega$, there is a corresponding pattern relative to the base meta-entity. Define g(h) to be the count in the definition of the corresponding pattern. If the pattern does not occur in the definition, define g(h)=0. Now to obtain Applicants' posterior distribution use the following formula:

$$p(h) = \frac{f(h)S + g(h)}{2S}.$$

Note that this is a true distribution because $\Sigma_{h \in \Omega} f(h)S + g(h) = 2S$. There is a special case of the algorithm that corresponds to the case of a null pattern. If Applicants encounter a dictionary entry that does not occur in Applicants' pattern dictionary, Applicants will not have a definition, and thus no count sum. In such a situation Applicants simply calculate Applicants' distribution on the hypothesis space using the likelihood algorithm. Thus in the case where a dictionary entry is not in the pattern dictionary, Applicants will give no weight to the pattern algorithm. This is equivalent to 'pushing' in the staged algorithm.

If one wanted to delve more deeply into the workings of the likelihood and pattern algorithms one could come up with some sort of likelihood equivalent to the count sum. Unfortunately when calculating the probabilities for a hypothesis in the likelihood algorithm it is not immediately obvious how many observations went into the calculation. Thus for any hypothesis Applicants can adopt a simple count system. To do so, for the leading hypothesis, create an error report for each of the extractors. For each error figure out how many times Applicants saw that error for that extractor in training For each extractor figure out which error Applicants saw the least. Then average the counts of these minimum errors across the different extractors. This will be Applicants' count sum $\overline{S}$ for the likelihood algorithm. Now, using the notation from the last section, calculate the posterior distribution:

$$p(h) = \frac{f(h)\overline{S} + g(h)}{S + \overline{S}}.$$

Note that in this case Applicants do not need to make a special case for nulls, because in the case of a null, g(h)=S=0. It is still equivalent to pushing to the likelihood algorithm. The problem with this calculation is that it might need to be "tuned" to avoid the likelihood algorithm's domination of the pattern algorithm. Because of the nature of the likelihood algorithm, Applicants are going to observe a lot more of most likelihood error types than Applicants are going to observe any particular dictionary entry. This is undesirable because in general the likelihood algorithm does not significantly outperform the pattern algorithm. But it does in principle accomplish what Applicants wish to accomplish. For example Applicants are much more likely to see a text added or text missed than a break added or break missed. Thus Applicants will place more weight on hypotheses that come from text added or text missed errors than Applicants would on break added or break missed errors.

Lastly, Applicants may use the Delta Method. First Applicants will review exactly how probabilities are calculated in the Likelihood algorithm. Let $\Omega_x$ be the hypothesis space for meta-entity x. Let $D_x = D_{1x} \cup L \cup D_{Kx}$ be the outputs from the K different extractors. Given $H_{jx} \in \Omega_x$, $$P(H_{jx} \mid D_x) \propto \prod_{k=1}^{K} \prod_{\tau_i \in T_{jk}} \sum_{\tau^{m,n} \in T} P_k(\tau^{m,n}) \prod_{e_j \in E} P_k(s_{\tau_i}(e_j) \mid \tau^{m,n}),$$

where Applicants define $P_k(s_{\tau_i}(e_j) \mid \tau^{m,n}) = 0$ if $\tau_i$ is not of type $\tau^{m,n}$. To use the Delta method Applicants need to avoid the use of the summation. To do so Applicants will introduce the function $I(\tau_i)$=the transformation type of $\tau_i$. Then Applicants can rewrite the above equation as:

$$P(H_{jx} \mid D_x) \propto \prod_{k=1}^{K} \prod_{\tau_i \in T_{jk}} P_k(I(\tau_i)) \prod_{e_j \in E} P_k(s_{\tau_i}(e_j) \mid I(\tau_i)).$$

Apply a logarithm to both sides:

$$\log(P(H_{jx} \mid D_x)) \propto \sum_{k=1}^{K} \sum_{\tau_i \in T_{jk}} \left[ \log(P_k(I(\tau_i))) + \sum_{e_j \in E} \log(P_k(s_{\tau_i}(e_j) \mid I(\tau_i))) \right]$$

Using the assumption that the extractors are independent Applicants obtain:

$$\text{var}(\log(P(H_{jx} \mid D_x))) \propto \qquad (1)$$
$$\sum_{k=1}^{K} \sum_{\tau_i \in T_{jk}} \left[ \text{var}(\log(P_k(I(\tau_i)))) + \sum_{e_j \in E} \text{var}(\log(P_k(s_{\tau_i}(e_j) \mid I(\tau_i)))) \right]$$

One may now use the delta method to obtain:

$$\text{var}(\log(P_k(I(\tau_i)))) = \frac{\text{var}(P_k(I(\tau_i)))}{(P_k(I(\tau_i)))^2},$$

$$\text{var}(\log(P_k(s_{\tau_i}(e_j) \mid I(\tau_i)))) = \frac{\text{var}(P_k(s_{\tau_i}(e_j) \mid I(\tau_i)))}{(P_k(s_{\tau_i}(e_j) \mid I(\tau_i)))^2},$$

$$\text{var}(\log(P(H_{jx} \mid D_x))) \propto \frac{\text{var}(P(H_{jx} \mid D_x))}{(P(H_{jx} \mid D_x))^2}.$$

Using these substitutions in equation (1) results in:

$$\frac{\text{var}(P(H_{jx} | D_x))}{(P(H_{jx} | D_x))^2} \propto \sum_{k=1}^{K} \sum_{\tau_i \in T_{jk}} \left[ \frac{\text{var}(P_k(I(\tau_i)))}{(P_k(I(\tau_i)))^2} + \sum_{e_j \in E} \frac{\text{var}(P_k(s_{\tau_i}(e_j) | I(\tau_i)))}{(P_k(s_{\tau_i}(e_j) | I(\tau_i)))^2} \right] \quad (2)$$

Multiplying by $(P(H_{jx}|D_x))^2$ will allow one to compute the variance, $\sigma_L(H_{jx})$, for the likelihood algorithm. Calculating the variance for the pattern algorithm, $\sigma_P(H_{jx})$, is done easily using the variance of the binomial distribution. Applicants will assume a normal distribution on the error space. (In reality it is the product of normal distributions. It will be uni-modal.) Then Applicants can use normal-normal conjugacy to combine Applicants' probability estimates:

$$P(H_{jx}) = \frac{\sigma_L(H_{jx})^2}{\sigma_P(H_{jx})^2 + \sigma_L(H_{jx})^2} P_P(H_{jx}) + \frac{\sigma_P(H_{jx})^2}{\sigma_P(H_{jx})^2 + \sigma_L(H_{jx})^2} P_L(H_{jx})$$

3.3 Bayesian Model Averaging

In each of the aforementioned cases, the staging and hybrid algorithms described essentially defer most of the weight in the final decision to one algorithm or the other. This is not necessarily the only way to approach the problem. In Bayesian probability theory there is a concept called model averaging that allows multiple models to be combined when there is uncertainty in which model is most appropriate (e.g., "correct") for a given case. By effectively averaging over competing models, this approach incorporates model uncertainty into conclusions about both model parameters and model predictions. For the models described above, assessing uncertainty in the resultant model predictions is both non-trivial and novel. To date, results based on model averaging are quite promising. The BMA has been discussed in greater detail above.
Hybrid Method
3.4 Learning-Based Dispatching Given the fact that the different aggregation methods Applicants have developed have different strengths and weaknesses, it is intuitively sensible to combine them. Applicants have developed a "Dispatcher" for the framework that learns which aggregation algorithms are optimal given the defined features of a particular meta-entity. Two methods have been developed to perform this learning process, based upon Random Forests and Logistic Regression. This process and its role in the X-Man technology is described in greater detail in another section of the present disclosure. In addition, manual dispatching of meta-entities to a particular aggregation algorithm can be done as shown in FIG. 10.
Other Features of the Information Extraction System Several Main Experiment Options are shown in FIG. 10, for example:
   User may select a Bootstrapping option—no bootstrapping, or bootstrapping based on either folds or meta-entities.
   User may elect to manually dispatch incoming data to particular algorithms, or to use automated dispatching.
   User may specify a name and description for each algorithm
   User may specify a data set and the base extractors to be used.

Some dispatcher options are shown in FIG. 11, for example:
   For automated dispatching (not shown), the user may select either Logistic Regression or Random Forest to learn the optimal dispatching strategy for incoming data. For the Random Forest, forest size and split dimension can be specified by the user.

An exemplary user-selected algorithm setting where incoming data may be dispatched to a specific user-selected algorithm variants is show in FIG. 12. FIG. 12 is an exemplary screenshot for when auto-dispatching using Random Forest has been selected. Other user-selected algorithms settings are also possible. For example there are:
   Likelihood Algorithm (LA) with a Transformation-based False Alarm rate (e.g., Standard). This variant of the LA estimates the False Alarm rate as # False Alarms/# Transformations. A prior (strong or weak) may be specified (not shown in FIG. 12).
   LA with a Token-based False Alarm rate (e.g., Global FA). This variant of the LA estimates the False Alarm rate as # Tokens in False Alarms/# Tokens. A prior (strong or weak) may be specified (shown in FIG. 12).
   Pattern Algorithm (PA), stepping down k levels, where for K base extractors, k=0, 1, . . . , K−1 (not shown in FIG. 12).
   Lower Bound Maximization. The user may specify a default alpha value (not shown in FIG. 12).
   Majority Rule (B-I-O simple majority). The user may elect to break ties via random choice, or to maximize Precision or Recall. Moreover, the user may choose to break ties with the "best" base extractor relative to a desired performance metric (e.g., detection rate, miss rate) (not shown in FIG. 12).
   Bayesian Model Averaging. The user may specify the model class, as well as the type and value of model priors. Weights may also be manually specified(not shown in FIG. 12).
   Sequence Algorithm. The user may specify a window size (not shown in FIG. 12).
   Best extractor relative to a desired performance metric (not shown in FIG. 12).
   Base extractor. The user may elect to specify particular base extractors to which incoming data may be dispatched (not shown in FIG. 12).

Figure 15:
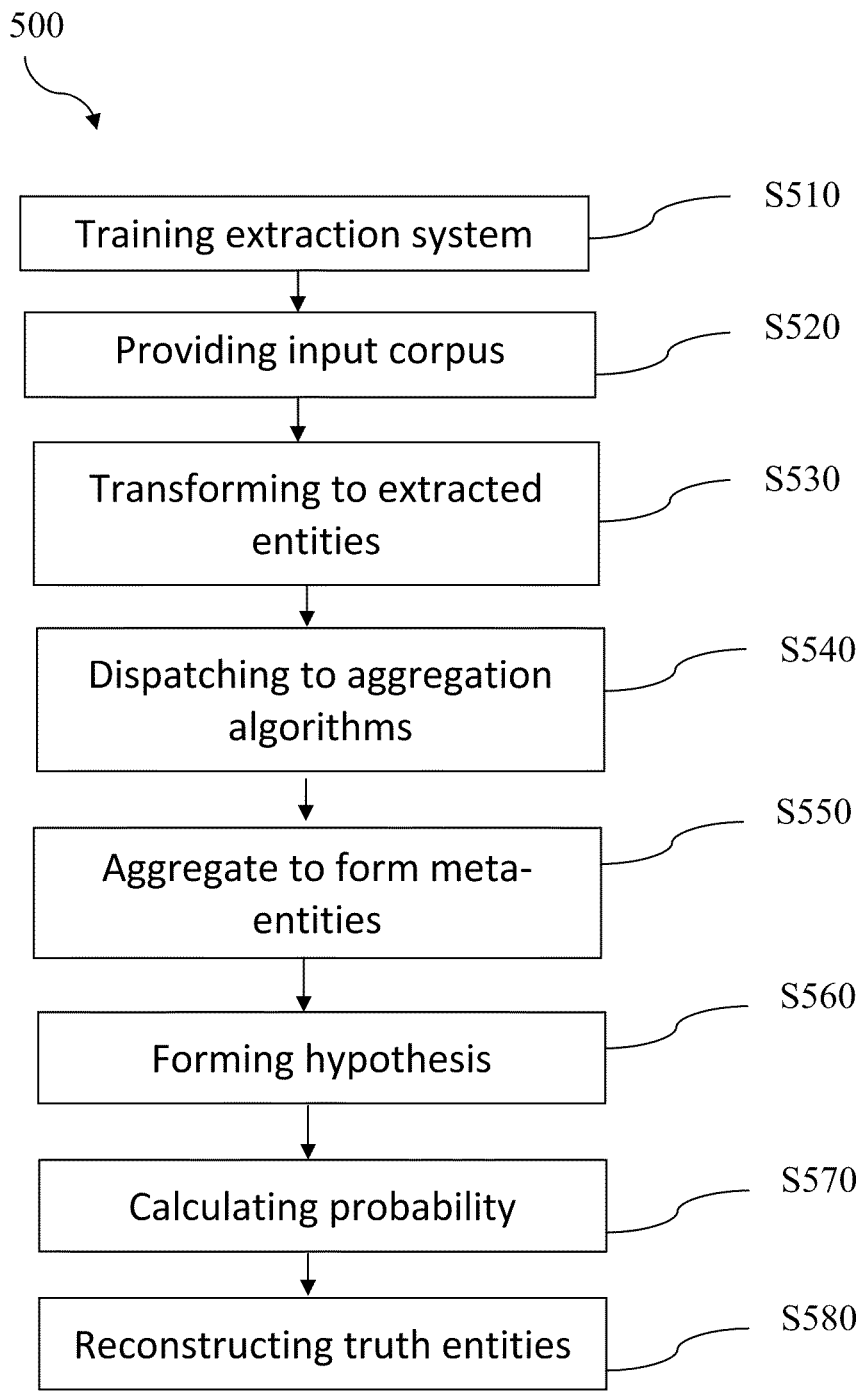
FIG. 15 shows a flow chart of a method of operation of an exemplary information extraction system according to a further embodiment of the present disclosure.

Referring now to FIG. 15, therein is shown a flow chart of a method 500 of operation of the information extraction system 100 of FIG. 13 in a further embodiment of the present disclosure. The method 500 includes: training the information extraction system (200) in a step S510; providing an input corpus (218) of texts in a step S520; transforming the input corpus (218) to an extractor output (239) of extracted entities (235) by each of the plurality of extractors (232) in a step S530; dispatching the input corpus (218) to one or more aggregation algorithms (242) based on defined featured of the input corpus (218) in a step S540; aggregating the extracted entities (235) from the plurality of extractors (232) to form meta-entities (245) in a step S550; forming a plurality of hypothesis (244) for each meta-entity (245) in a step S560; calculating the probability for each hypothesis (244) base on the probability distribution over the transformation space and the error space for each entity extractor (232) in a step S570; and reconstructing a truth entity (217) based one or more hypothesis (244) ranked by probability in a step S580.

The examples set forth above are provided to give those of ordinary skill in the art a complete disclosure and description of how to make and use the embodiments of the present disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. For example, the person skilled in the art will understand that the number steps or components shown is only indicative and that the method can occur in more or fewer steps and that the system may contain more or less components according to the various embodiments. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

REFERENCES

[1] Z. Kozareva, O. Ferrández, et al., "Combining data-driven systems for improving named entity recognition," *Data & Knowledge Engineering*, vol. 61-3, pp. 449-466, June 2007.

[2] D. Duong, B. Goertzel, et al., "Support vector machines to weight voters in a voting system of entity extractors," in *Proc. IEEE World Congress on Computational Intelligence*, Vancouver, Canada, 2006, 1226-1230.

[3] H. Wang, and T. Zhao, "Identifying named entities in biomedical text based on stacked generalization," in *Proc. 7th World Congress on Intelligent Control and Automation*, Chongqing, China, 2008, pp. 160-164.

[4] D. Wu, G. Ngai, and M. Carpuat, "A stacked, voted, stacked model for named entity recognition," in *Proc. CoNLL-2003*, vol. 4, Edmonton, Canada, 2003, pp. 200-203.

[5] R. Florian, "Named entity recognition as a house of cards: classifier stacking," in *Proc. 6th Conference on Natural Language Learning*, Taipei, Taiwan, vol. 20, 2002, pp. 1-4.

[6] N. Kambhatla, "Minority vote: at-least-N voting improves recall for extracting relations," in *Proc. COLING/ACL on Main Conference Poster Sessions*, Sydney, Australia, 2006, pp. 460-466.

[7]

[8] R. Florian, A. Ittycheriah, et al., "Named entity recognition through classifier combination," in *Proc. CoNLL-2003*, vol. 4, Edmonton, Canada, 2003, pp. 168-171.

[9] L. Si, T. Kanungo, and X. Huang, "Boosting performance of bio-entity recognition by combining results from multiple systems," in *Proc. 5th International Workshop on Bioinformatics*, Chicago, Ill., 2005, pp. 76-83.

[10] H. Cunningham, D. Maynard, et al., "GATE: a framework and graphical development environment for robust NLP tools and applications," in *Proc. 40th Anniversary Meeting of the Assoc. for Computational Linguistics*, Philadelphia, Pa., 2002.

[11] Alias-I LingPipe 3.8.2, 2008, Alias-i, Inc. 181 North 11th St, #401, Brooklyn, N.Y. 11211, http://alias-i.com/lingpipe. URL verified Feb. 24, 2011.

[12] Stanford Named Entity Recognizer 1.1, 2008, Stanford NLP Group, Stanford University, Gates Computer Science Building, 353 Serra Mall, Stanford, Calif. 94305-9010, http://nlp.stanford.edu/software/CRF-NER.shtml. URL verified Feb. 24, 2011.

[13] University of Ottawa Baseline Information Extraction (BALIE) 1.81, 2004, School of Information Technology and Engineering, University of Ottawa, 800 King Edward Avenue Ottawa, Ontario K1N 6N5 Canada, http://balie.sourceforge.net/. URL verified Feb. 24, 2011.

[14] T. Lemmond, et al., "Enhanced Named Entity Extraction via Error-Driven Aggregation," in *Proc. Intl. Conference on Data Mining*, Las Vegas, Nev., July, 2010, pp. 31-37.

[15] Z. Harris, "Distributional Structure," Word, 1954.

[16] N. J. A. Sloane, *On-line Encyclopedia of Integer Sequences*, 2003. The OEIS Foundation Inc., 11 South Adelaide Avenue, Highland Park, N.J., 08904, http://oeis.org/A001519. URL verified Feb. 24, 2011.

[17] P. Domingos, "Bayesian Averaging of Classifiers and the Overfitting Problem," in *Proc. of the 17th ICML*, pp. 223-230, 2000.

[18] M. Kearns and U. Vazirani, "An Introduction to Computational Learning Theory," MIT Press, 1994.

[19] J. Hoeting, D. Madigan, A. Raftery, and C. Volinsky, "Bayesian model averaging: A tutorial (with discussion)," *Statistical Science*, 14(4):382-417, 1999.

APPENDIX 1

Given a collection of meta-entities, each algorithm has its own method for determining a probability distribution over error space. This probability distribution may be represented in different ways, over an error space that may be either implicitly or explicitly specified. Similarly, each algorithm has a corresponding method for determining the "probability" or "likelihood" (value used for ranking) of a hypothesis based upon the previously computed probability distribution. Note also that various independence assumptions may be made in the estimation of this probability distribution. One might assume that all extractors are statistically independent, all statistically dependent, or some combination thereof. In addition, one might also assume that one or more extractors are redundant, and decisions might be made on the basis of some subset of the extractors. These methods can exploit all the variants of these assumptions.

I. Short description of each algorithm
  (i) Likelihood algorithm:
    a. An error space is explicitly defined. A probability distribution(s) over this error space is determined numerically via frequentist probability estimation methods.
    b. The likelihood (or probability) of a hypothesis is determined by the probability of the observed errors under the assumption that the hypothesized entities are equal to truth. This probability is computed according to the probability distribution(s) from (a) under specified independence assumptions.
  (ii) Pattern Algorithm variants
    a. Each meta-entity derived from an evaluation corpus is associated with a pattern, the meta-entity pattern, whose length and complexity is determined by disagreements among the extractors with respect to entity boundaries. This pattern consists of a collection of simple patterns—one for each extractor (representing its extracted entities). The truth entities associated with a meta-entity are also represented by a simple pattern. Every time a particular meta-entity pattern is encountered in the evaluation corpus, the truth pattern associated with it is tallied, so that the completed pattern dictionary contains a record of the frequency with which the meta-entity was associated with each truth pattern. In this fashion, the error space is implicitly represented by the pattern, and a probability distribution over this error space is determined implicitly via the pattern dictionary.

Note: Sub-patterns of the meta-entities are also tracked in the pattern dictionary, such as column-wise sub-patterns, and sub-patterns corresponding to subsets of the extractors (e.g. subset sub-patterns). These sub-patterns are utilized only when necessary, as described in part (b)

b. Each hypothesis is assigned a probability derived from the frequency with which its pattern was associated (as truth) with the meta-entity pattern in question. Note that this relies upon the assumption that the meta-entity pattern encountered in the input data was previously observed in the evaluation corpus (and hence, present in the pattern dictionary). When an input pattern is not found in the pattern dictionary, Applicants revert to two alternative variants:

i. Simple k-way decision: Assume that Applicants are working with K extractors and the pattern associated with these K extractors is not found in the pattern dictionary. Then the probability is derived collectively from all of the k-way sub-patterns found in the pattern dictionary for the largest such k<K. The k-way sub-pattern is an example of a subset sub-pattern ii. Lower Bound Maximization: For each extractor combination, Applicants compute a lower Bayesian bound on the estimated probability of the top-ranking hypothesis. The hypothesis have the highest such bound is selected as the truth.

(iii) The Sequential Model a. The pattern dictionary is constructed according to (ii)(a), specifically, the columnwise pattern counts will be used here.

b. Each pattern can be regarded as a sequence of columns, in which each column is dependent on some number, say n, of those preceding it. Under this framework, the probability for each hypothesis is computed as for an nth-order Markov model.

(iv) Bayesian Model Averaging (BMA)

a. The pattern dictionary is constructed according to (ii)(a)

b. A prior probability is assigned to each model; a model might be (for example) an assumption that one extractor is redundant, or an assumption that all extractors are independent. A probability estimate is computed for each hypothesis under each model. A posterior distribution is estimated for each model given the data. The probability estimates for each hypothesis are combined via the model posterior to produce a final estimate.

II. Key steps of each algorithm (i) Likelihood algorithm:

a. Estimating a probability distribution over error space:

i. The error space is explicitly defined.

ii. Independence assumptions among errors and among extractors are specified.

iii. A probability distribution(s) over this error space is determined numerically.

b. Assigning a value (likelihood) to a hypothesis i. Under the assumption that the hypothesis entities are truth, the observed errors are determined.

ii. The probability of observing these errors is computed directly from (i)a.ii. and (i)a.iii.

Pattern definitions, variants, and key steps for each:

Meta-entity pattern: Rows of character sequences that describe the relative textual characteristics of the extracted entities of all extractors within a meta-entity. Each row corresponds to the extracted entities of one extractor. For example, there may be one character per word. Or each character in the pattern may be determined by disagreement among the extractors on entity boundaries.

Truth pattern: A sequence of characters that describes the textual characteristics of the truth entities relative to a meta-entity.

Subset Sub-pattern: The portion of a meta-entity pattern that corresponds to a subset of the extractors Columnwise sub-pattern: The portion of a meta-entity pattern consisting of a subset of its columns.

Vote: A single occurrence of a specific meta-entity pattern with a specific truth pattern in the evaluation corpus. The truth pattern having the highest number (e.g. count) of votes may be considered the most likely.

(ii) Pattern Algorithm with simple k-way decision a. Estimating a probability distribution over error space (the space is implicit in the pattern):

i. A pattern dictionary is constructed from the evaluation corpus in the following manner: for each meta-entity in the evaluation corpus, its associated meta-entity pattern is determined ii. The truth pattern associated with it is tallied (e.g., a vote is recorded), so that the completed pattern dictionary contains a record of the frequency with which the meta-entity was associated with each truth pattern.

iii. The truth pattern associated with each subset sub-pattern of the meta-entity pattern is also tallied.

b. Assigning a value (likelihood) to a hypothesis i. Each hypothesis is converted to a truth pattern relative to its associated meta-entity pattern. Specifically, the length and structure of a meta-entity pattern is determined by the meta-entity. The truth pattern should conform to that length and structure. For example, consider two extractors, E1 and E2. E1 extracts "Bush" and E2 extracts "George Bush". Because they disagree on where the entity boundary is, we might have the pattern E1, E2=01, 11 (that is, a pattern of length 2 . . . if they both extracted "George Bush", we might utilize a pattern of length 1). Now, suppose the associated truth entity is "George Bush"—its pattern will be 11, because its length and structure should be consistent with that of the meta-entity.

ii. The hypothesis is assigned a probability derived from the relative frequency with which its truth pattern was associated with the meta-entity pattern in question.

iii. When an input meta-entity pattern is not found in the pattern dictionary, the probability is derived similarly from the k-way subset sub-patterns found in the pattern dictionary for the largest possible k less than the number of extractors.

(iii) Pattern Algorithm with Lower Bound Maximization (LBM)
  a. Estimating a probability distribution over error space (the space is implicit in the pattern):
    i. Identical to II (ii) a.
  b. Assigning a value to a hypothesis
    i. Each hypothesis is converted to a truth pattern relative to its associated meta-entity pattern
    ii. The hypothesis is assigned a probability derived from the relative frequency with which its truth pattern was associated with the meta-entity pattern in question.
    iii. When an input pattern is not found in the pattern dictionary, for each extractor combination, Applicants compute a lower Bayesian bound on the estimated probability of the top-ranking hypothesis. This bound is the value assigned to the top-ranking hypotheses and they are ranked accordingly.
(iv) The Sequential Model
  a. Estimating a probability distribution over error space (the space is implicit in the pattern):
    i. A pattern dictionary is constructed from the evaluation corpus in the following manner: for each meta-entity in the evaluation corpus, its associated meta-entity pattern is determined
    ii. The truth pattern associated with it is tallied (e.g., a vote is recorded), so that the completed pattern dictionary contains a record of the frequency with which the meta-entity was associated with each truth pattern.
    iii. The truth pattern associated with each columnwise sub-pattern of the meta-entity pattern is also tallied.
  b. Assigning a value to a hypothesis
    i. Each hypothesis is converted to a truth pattern relative to its associated meta-entity pattern
    ii. Each meta-entity pattern is regarded as a sequence of columns, in which each column is statistically dependent on the n columns preceding it. Under this framework, the probability for each hypothesis is computed as for an nth-order Markov model, where the relevant conditional probabilities are derived from the pattern dictionary.
(v) Bayesian Model Averaging (BMA)
  a. Estimating a probability distribution over error space (the space is implicit in the pattern):
    i. Identical to II (ii) a.
  b. Assigning a value to a hypothesis
    i. Each hypothesis is converted to a truth pattern relative to its associated meta-entity pattern
    ii. A prior probability is assigned to each model; a model might be (for example) an assumption that one extractor is redundant, or an assumption that all extractors are independent.
    iii. A probability estimate is computed for each hypothesis under each model.
    iv. A posterior distribution is estimated for each model given the data (e.g., the tallied "votes" in the pattern dictionary).
    v. The probability estimates for each hypothesis are combined via the model posterior to produce a final estimate.

The invention claimed is:

1. A method of operating an information extraction system, comprising:
  providing the information extraction system, the information extraction system comprising
    i. a processor master device, configured to receive input data and experimental options;
    ii. a plurality of processor extractor devices, configured to transform input data into extractor outputs;
    iii. a processor aggregator device, configured to aggregate extracted entities of the plurality of extractor outputs to form meta-entities, dispatch meta-entities to aggregation algorithms, form hypotheses for each meta-entity, calculate probability for each hypothesis, and reconstruct a truth entity based on each hypothesis, wherein each of the meta-entities is formed from the extracted entities of at least two processor extractor devices of the plurality of processor extractor devices;
    iv. a processor storage device, configured to store input data, extractor outputs, and other files; and
    v. a processor communication device, configured to enable high bandwidth communication of data between the devices of the information extraction system;
  calibrating the information extraction system by:
    calibrating a plurality of aggregation algorithms executed by the aggregator device; and
    calibrating a dispatcher of the aggregator device, wherein the calibrating comprises
      (a) providing a training corpus of text containing a plurality of known entities to train a plurality of entity extractors, thus forming a plurality of trained entity extractors;
      (b) transforming, using each of a plurality of trained entity extractors, a corresponding evaluation corpus to extractor outputs of extracted entities;
      (c) combining the extracted entities from the plurality of trained entity extractors to form meta-entities, wherein each of the meta-entities is formed from the extracted entities of at least two trained entity extractors of the plurality of trained entity extractors;
      (d) mapping each meta-entity to one or more known entities, thus revealing the errors induced by the transforming of known entities into extracted entities by the plurality of entity extractors;
      (e) determining and storing a probability distribution for the errors induced by the plurality of entity extractors across the plurality of meta-entities, wherein determining and storing a probability distribution for the errors induced by the plurality of entity extractors across the plurality of meta-entities further comprises
        a. estimating the probability distribution over an implicit space of the errors;
        b. constructing a pattern dictionary from the evaluation corpus by determining a meta-entity pattern for each meta-entity and a truth pattern for each known entity;
        c. recording a first tally of votes for the number of times each truth pattern is associated with the meta-entity pattern; and
        d. recording a second tally of votes for the number of times each truth pattern is associated with a subset sub-pattern of the meta-entity pattern; and
      (f) determining an aggregate probability distribution for the errors induced by a plurality of entity extractors over the training corpus, thus calibrating each aggregation algorithm;
  providing an input corpus of texts utilizing the master device and the communication device;

transforming, using each of a plurality of extractors executed by the extractor devices, the input corpus to extractor outputs of extracted entities;

combining the extracted entities from the plurality of extractors to form meta-entities by the aggregator device;

dispatching the meta-entities, via the calibrated dispatcher executed by the aggregator device, to one or more aggregation algorithms based on defined features of the meta-entities;

forming a plurality of hypotheses for each meta-entity;

calculating a value for each hypothesis; and reconstructing a truth entity based on one or more hypothesis ranked by the value calculated for each hypothesis.

2. The method according to claim 1, wherein the calculating of a value for each hypothesis further comprises:

converting each hypothesis to a truth pattern relative to the associated meta-entity pattern;

assigning a probability for each hypothesis based on the first tally of votes for the number of times each truth pattern is associated with the meta-entity pattern; and assigning a probability for each hypothesis in the case when the meta-entity pattern is not found in the pattern dictionary by:

examining the truth patterns created with the highest number of entity extractors less than the total number of entity extractors used, where the meta-entity pattern can be found in the pattern dictionary; and assigning a probability for each hypothesis based on the second tally of votes for the number of times each truth pattern is associated with a subset sub-pattern of the meta-entity pattern.

3. The method according to claim 1, wherein the calculating of a value for each hypothesis further comprises:

converting each hypothesis to a truth pattern relative to the associated meta-entity pattern;

assigning a probability for each hypothesis based on the first tally of votes for the number of times each truth pattern is associated with the meta-entity pattern; and assigning a probability for each hypothesis in the case when the meta-entity pattern is not found in the pattern dictionary by computing a lower Bayesian bound on the estimated probability of the top-ranking hypothesis.

4. The method according to claim 1, wherein the determining and storing a probability distribution for the errors induced by the plurality of entity extractors across the plurality of meta-entities further comprises:

recording a third tally of votes for the number of times each truth pattern is associated with a columnwise sub-pattern of the meta-entity pattern.

5. The method according to claim 4, wherein the calculating of a value for each hypothesis further comprises:

converting each hypothesis to a truth pattern relative to the associated meta-entity pattern;

assigning each columnwise sub-pattern as a sequence of columns within the associated meta-entity pattern, wherein each column is considered to be statistically dependent on the n number columns preceding the column in the sequence; and computing the probability value for each hypothesis based on each columnwise sub-pattern as an $n^{th}$ order Markov model, wherein conditional probabilities are derived from the pattern dictionary.

6. The method according to claim 1, wherein the calculating of a value for each hypothesis further comprises:

converting each hypothesis to a truth pattern relative to the associated meta-entity pattern;

assigning a prior probability for each model in a class of models;

computing a probability estimate for each hypothesis with each model;

estimating a posterior probability distribution over the class of models based on the first tally for the truth patterns in the pattern dictionary for each model; and combining the probability estimates for each hypothesis based on the posterior probability distribution to calculate the value for each hypothesis.

* * * * *